United States Patent
Hoopman et al.

[11] Patent Number: 5,975,987
[45] Date of Patent: Nov. 2, 1999

[54] METHOD AND APPARATUS FOR KNURLING A WORKPIECE, METHOD OF MOLDING AN ARTICLE WITH SUCH WORKPIECE, AND SUCH MOLDED ARTICLE

[75] Inventors: Timothy L. Hoopman, River Falls, Wis.; Stanley B. Collins, White Bear Lake; James A. Servatius, Inver Grove Heights, both of Minn.

[73] Assignee: 3M Innovative Properties Company, St. Paul, Minn.

[21] Appl. No.: 08/894,978

[22] PCT Filed: Oct. 5, 1995

[86] PCT No.: PCT/US95/13074

§ 371 Date: Sep. 3, 1997

§ 102(e) Date: Sep. 3, 1997

[87] PCT Pub. No.: WO97/12727

PCT Pub. Date: Apr. 10, 1997

[51] Int. Cl.$^6$ .............................. B24B 1/00; B24D 11/00
[52] U.S. Cl. .......................... 451/28; 451/527; 451/550; 72/110; 72/240; 264/145
[58] Field of Search ............................ 51/293, 295, 249, 51/309; 72/95, 110, 240; 264/145–147; 428/143; 451/28, 527, 550

[56] References Cited

U.S. PATENT DOCUMENTS

| | | |
|---|---|---|
| 1,151,829 | 8/1915 | Schliker . |
| 1,414,668 | 5/1922 | Reed . |
| 1,949,512 | 3/1934 | Norton . |
| 1,988,065 | 1/1935 | Wooddell . |
| 1,989,651 | 1/1935 | Drummond . |
| 2,245,654 | 6/1941 | Drader et al. . |
| 2,378,261 | 6/1945 | Turney . |
| 2,546,058 | 3/1951 | Boulet . |
| 2,579,611 | 12/1951 | Poorman . |
| 2,684,604 | 7/1954 | Froberg, Jr. . |
| 2,870,661 | 1/1959 | Poorman . |
| 2,870,662 | 1/1959 | Poorman . |
| 3,017,697 | 1/1962 | Wlodek . |
| 3,055,240 | 9/1962 | Patzman et al. . |
| 3,133,344 | 5/1964 | Keasler . |
| 3,689,346 | 9/1972 | Rowland . |
| 3,765,208 | 10/1973 | Cozert, Jr. . |
| 3,924,430 | 12/1975 | Plevyak . |
| 3,972,212 | 8/1976 | Brinkman . |
| 4,030,331 | 6/1977 | Keasling . |
| 4,085,553 | 4/1978 | Prunier . |

(List continued on next page.)

FOREIGN PATENT DOCUMENTS

| | | |
|---|---|---|
| 0 393 540 | 10/1990 | European Pat. Off. . |
| 1151256 | 4/1957 | France . |
| 1583011 | 9/1969 | France . |
| 2 299 123 | 8/1976 | France . |
| 1 278 276 | 2/1966 | Germany . |
| 235517 | 2/1926 | United Kingdom . |
| 458373 | 12/1936 | United Kingdom . |
| 1217378 | 12/1970 | United Kingdom . |
| WO 94/27787 | 12/1994 | WIPO . |
| WO 95/07797 | 3/1995 | WIPO . |
| WO 95/22436 | 8/1995 | WIPO . |

OTHER PUBLICATIONS

Catalog No. 3, *Eaglerock Technologies,* published by Eaglerock Technologies International Corp., B–13, 15 Merry Lane, P.O. Box 332, East Hanover, New Jersey 07936 USA.
"How The Surface Relief Of Abrasive Belts Affects Efficiency In Grinding Jobs" from Soviet Engineering Research vol. 9, No. 6 (1989) New York, pp. 103–106 Search Report.

*Primary Examiner*—Timothy V. Eley
*Attorney, Agent, or Firm*—James J. Trussell

[57] ABSTRACT

A method and apparatus for knurling a workpiece in which the knurl pattern has an oblique helix angle relative to the longitudinal axis of the cylindrical workpiece. Also disclosed is a method of molding a molded article with the knurled workpiece to impart the inverse of the knurl pattern onto the molded article, such a molded article, a method of forming a structured abrasive article with the molded article, and such an abrasive article.

35 Claims, 9 Drawing Sheets

U.S. PATENT DOCUMENTS

| | | |
|---|---|---|
| 4,114,415 | 9/1978 | Vodopyanov et al. . |
| 4,257,250 | 3/1981 | Vanderhorst et al. . |
| 4,576,850 | 3/1986 | Mertens . |
| 4,584,861 | 4/1986 | Bartilson et al. . |
| 4,706,529 | 11/1987 | Hawle . |
| 5,015,266 | 5/1991 | Yamamoto . |
| 5,046,226 | 9/1991 | Che . |
| 5,152,917 | 10/1992 | Pieper et al. . |
| 5,156,863 | 10/1992 | Pricone et al. . |
| 5,197,317 | 3/1993 | Della Torre . |
| 5,435,816 | 7/1995 | Spurgeon et al. . |
| 5,437,754 | 8/1995 | Calhoun . |
| 5,453,312 | 9/1995 | Haas et al. . |
| 5,489,235 | 2/1996 | Gagliardi et al. . |
| 5,581,989 | 12/1996 | Mann et al. . |
| 5,658,184 | 8/1997 | Hoopman et al. . |
| 5,670,188 | 9/1997 | May et al. . |
| 5,681,217 | 10/1997 | Hoopman et al. . |

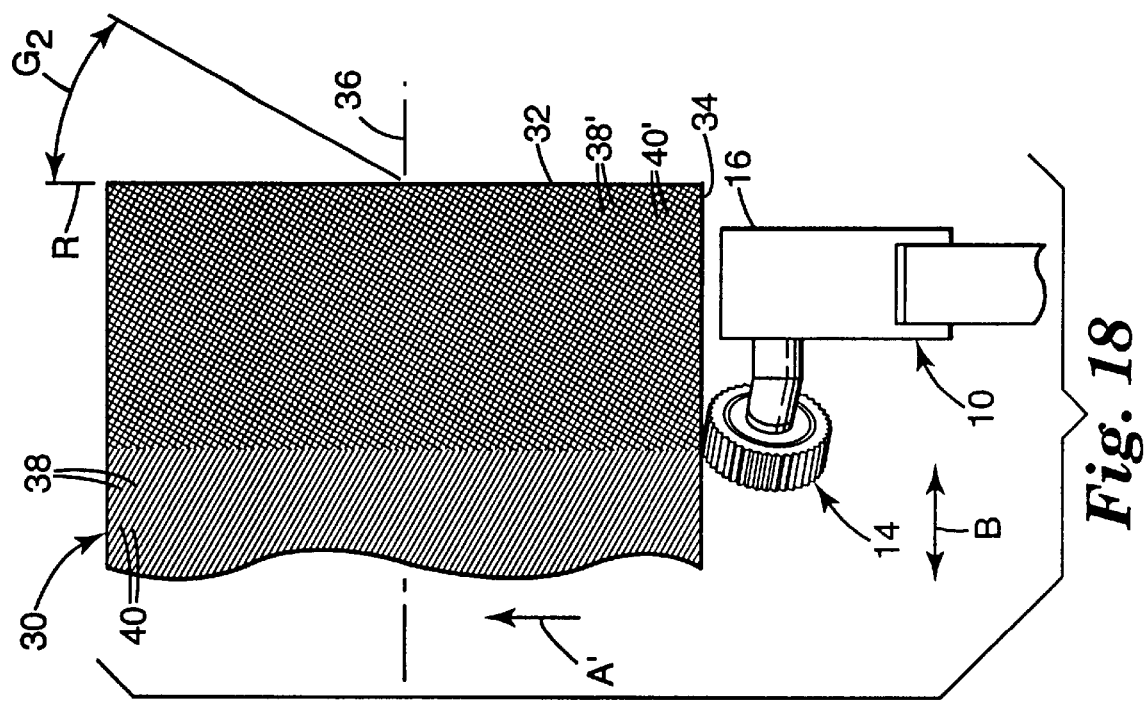
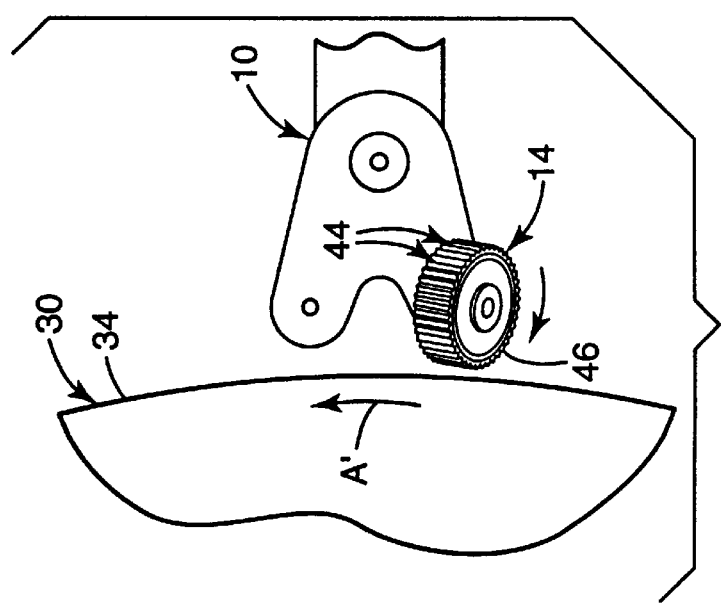

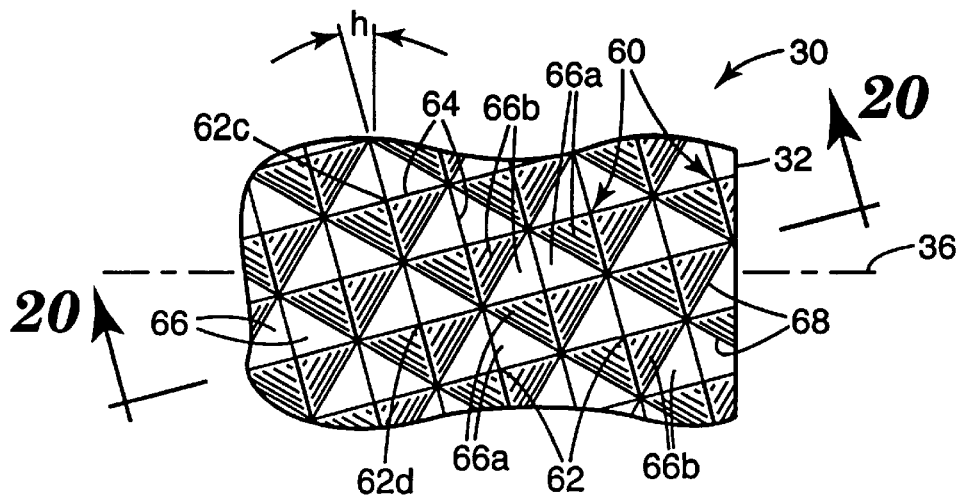
Fig. 19
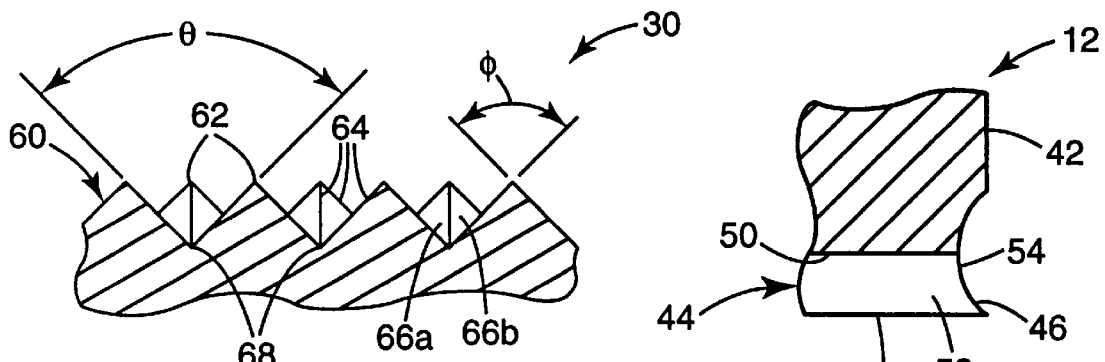
Fig. 20     Fig. 21
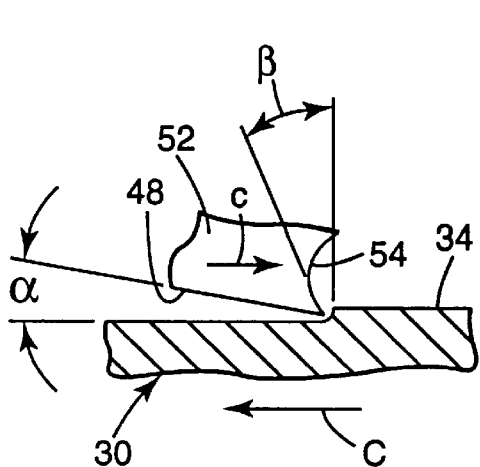     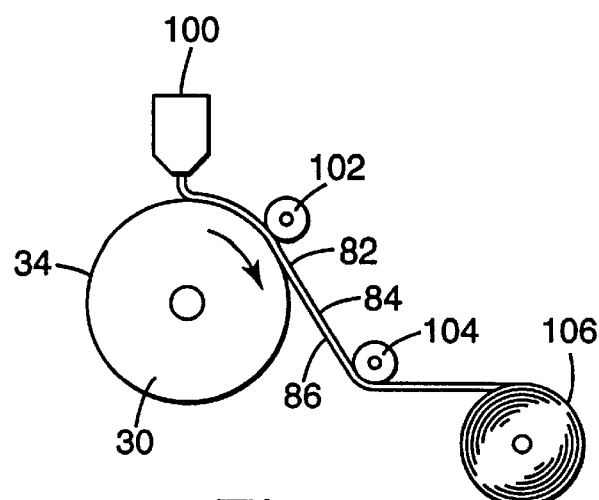
Fig. 22     Fig. 23

METHOD AND APPARATUS FOR KNURLING A WORKPIECE, METHOD OF MOLDING AN ARTICLE WITH SUCH WORKPIECE, AND SUCH MOLDED ARTICLE

TECHNICAL FIELD

The present invention relates to a method and apparatus for knurling a workpiece, a production tool molded with the knurled workpiece, and a method and apparatus for making an abrasive article with the production tool.

BACKGROUND OF THE INVENTION

The present invention is useful for making an abrasive article in which a structured abrasive coating is provided on a substrate. The abrasive coating comprises abrasive particles and a binder in the form of a precise, three dimensional abrasive composites molded onto the substrate.

A structured abrasive is a form of an abrasive article in which a substrate bears on a major surface thereof abrasive composites comprising a plurality of abrasive grains dispersed in a binder. The binder serves as a medium for dispersing the abrasive grains, and it may also bind the abrasive composites to the substrate. The abrasive composites have a predetermined three-dimensional shape, e.g., pyramidal. In one form, the dimensions of a given composite shape can be made substantially uniform and the composites can be disposed in a predetermined array. The predetermined array can be in linear form or matrix form.

Such a structured abrasive article can be prepared by a method generally as follows. A slurry containing a mixture of a binder precursor and a plurality of abrasive grains is applied onto a production tool having cavities which are the negative of the final shape of the abrasive composites. A substrate is brought into contact with the exposed surface of the production tool such that the slurry wets the first major surface of the substrate to form an intermediate article. Then, the binder is at least partially solidified, cured, or gelled before the intermediate article departs from the exposed surface of the production tool to form a structured abrasive article. The abrasive article is then removed from the production tool and fully cured if it was not fully cured in the previous step. Alternatively, the slurry can be applied onto the first major surface of the substrate and then the production tool can be brought into contact with the first major surface of the substrate. The precise nature of the abrasive composites provides an abrasive article that has a high level of consistency. This consistency further results in excellent performance.

Structured abrasives, and methods and apparatuses for making such structured abrasives, are described in U.S. Pat. No. 5,152,917, "Structured Abrasive Article," (Pieper et al.), issued Oct. 6, 1992, the entire disclosure of which is incorporated herein by reference. In one embodiment, Pieper et al. teaches an abrasive article comprising precisely shaped abrasive composites bonded to a backing in which the composites comprise abrasive particles and a binder. Pieper et al. teaches, among other things, a method of making the structured abrasive article generally in accordance with the method described briefly above. Pieper et al. teaches that the production tool can be a belt, a sheet, a coating roll, a sleeve mounted on a coating roll, or a die, and that the preferred production tool is a coating roll. Pieper et al. teaches that, in some instances, a plastic production tool can be replicated from an original tool by embossing a thermoplastic resin onto a metal tool, for example. Such a metal tool can be fabricated by diamond turning, engraving, hobbing, assembling as a bundle a plurality of metal parts machined in the desired configuration, or other mechanical means, or by electroforming.

Other examples of structured abrasives and methods and apparatuses for their manufacture are disclosed in U.S. Pat. No. 5,435,816, "Method of Making an Abrasive Article," (Spurgeon et al.), issued Jul. 25, 1995, the entire disclosure of which is incorporated herein by reference. In one embodiment, Spurgeon et al. teaches a method of making an abrasive article comprising precisely spaced and oriented abrasive composites bonded to a backing sheet generally in accordance with the method described briefly above. Spurgeon et al. teaches that, in addition to other procedures, a thermoplastic production tool can be made according to the following procedure. A master tool is first provided. The master tool is preferably made from metal, e.g., nickel. The master tool can be fabricated by any conventional technique, such as engraving, hobbing, knurling, electroforming, diamond turning, laser machining, etc. The master tool should have the inverse of the pattern for the production tool on the surface thereof. The thermoplastic material can be embossed with the master tool to form the pattern. Embossing can be conducted while the thermoplastic material is in a flowable state. After being embossed, the thermoplastic material can be cooled. Spurgeon et al. also teaches that the production tool can be made of a thermosetting resin or a radiation cured resin. While Spurgeon et al. mentions briefly that the master tool can be made by knurling no specific method of knurling a master tool is shown, taught, or suggested by Spurgeon et al.

Two general methods of knurling are known. Knurling is typically performed by the first knurling process, referred to as roll knurling or form knurling. Form knurling is done by pressing a knurling wheel having a pattern on the working surface thereof against a workpiece. The knurling wheel has the inverse of the pattern that is to be imparted to the workpiece. The working surface of the knurling tool is pressed against the workpiece with sufficient force to cold form or press the outer surface of the workpiece into general conformity with the pattern on the knurling wheel. The second knurling process, referred to as cut knurling, is performed by orienting the knurling wheel relative to the workpiece such that the wheel cuts a pattern into the workpiece by removing metal chips. Both conventional knurling processes typically impart a diamond-based pattern in which the diamonds are aligned in the direction perpendicular to the longitudinal axis of the cylindrical workpiece. Conventional knurling processes have also been used to impart a square-based pattern, in which the squares are oriented to have their sides at 45° to the longitudinal axis of the workpiece. As with the diamond-based pattern, the square-based pattern is also aligned in the direction perpendicular to the longitudinal axis of the cylindrical workpiece. These processes are typically used to impart a non-slip pattern on a tool handle, machine control knob, or the like.

One known conventional cut knurling apparatus and method is described with reference to FIGS. 1–10. As seen in FIGS. 1-2, knurling tool 10 is used to knurl a pattern into the outer cylindrical surface 34 of workpiece 30. First knurling wheel 12 and second knurling wheel 14 are mounted onto knurling wheel holder 16. As seen in FIG. 3, tool holder 16 includes a pair of mounting posts which each comprise first portion 20 and second portion 22. Cap screw 18 is inserted through the central opening of the knurling wheel and fastened into the second portion of the mounting post 22. First and second wheels 12 and 14 are free to rotate about axes 26 and 28 respectively. The knurling wheel holder 16 has center plane of symmetry 24. The first mounting post portions 20 are parallel to plane 24. The second mounting post portions 22 are oriented at an angle from the center plane 24. This arrangement orients axis of rotation 26 of the first knurling wheel 12 at angle (a) relative to the center plane 24. Angle (a) is defined as the angle between a plane perpendicular to the plane of the page and including axis 26 and center plane 24 perpendicular to the page. The axis of rotation 28 of second wheel 14 is oriented at angle (b) relative to the center plane 24. Angle (b) is defined as the angle between a plane perpendicular to the plane of the page and including axis 28 and center plane 24 perpendicular to the page Also, as seen in FIG. 6, the orientation of the second portion of the mounting post causes the axis 26 of the first knurling wheel to be inclined towards the workpiece 30 by angle ($f_1$). Angle ($f_1$) is defined as the angle between a first plane tangential to the surface of the workpiece at the point of engagement of the first knurling wheel and a second plane perpendicular to the page and including axis 26. Similarly, the axis 28 of the second knurling wheel is inclined towards the workpiece 30 by angle ($f_2$) seen in FIG. 8. Angle ($f_2$) is defined as the angle between a first plane tangential to the surface of the workpiece at the point of engagement of the second knurling wheel and a second plane perpendicular to the page and including axis 28.

Knurling wheel 12 is illustrated in greater detail in FIGS. 9 and 10. Knurling wheel 12 has along its outer working surface a plurality of teeth 44. Each tooth 44 includes tooth ridge 48, tooth valley 50 and side surfaces 52. Wheel 12 also includes major opposed surfaces 42 (only one illustrated). Where the side surfaces 52 of the teeth 44 meet the major surface 42, an edge 46 is formed. The teeth 44 have a ridge included angle θ. The teeth 44 of second knurling wheel 14 are of the same configuration as the teeth of first knurling wheel 12.

One typical knurling tool 10 is available commercially from Eagle Rock Technologies Int'l Corp. of Bath, Pennsylvania, and is known as Zeus™ Cut-Knurling Tool No. 209. As shown in FIG. 3, this knurling tool 10 is typically provided with first and second knurling wheels 12, 14 in which the teeth 44 are oriented parallel to the respective wheel axis 26, 28. Accordingly, the teeth have an included angle (c) measured at the point of contact of the wheels with the workpiece which is the sum of angles (a) and (b), and which is centered on center plane 24. Angles (a) and (b) are typically each 30°, resulting in angle (c) being 60°. Under this arrangement, the knurling tool 10 will form a diamond-based knurl pattern, the four-sided diamond bases having opposed 60° corners and 120° corners. This knurling tool 10 also is configured to allow each mounting post to rotate about the longitudinal axes of its respective first portion 20. Such rotational adjustments are calibrated to the diameter of the workpiece 30. The adjustments are intended to orient angles (a), (b), ($f_1$) and ($f_2$) to the particular workpiece to allow cut knurling of various sized workpieces.

The operation of known cutting tool 10 is illustrated in FIGS. 1 and 2. The mounting posts are pivoted to the appropriate calibration for the diameter of the workpiece to adjust angles (a), (b), ($f_1$) and ($f_2$). Workpiece 30 is rotated by a conventional lathe drive means in direction A. The tool 10 is moved towards the workpiece 30 until the desired engagement between teeth 44 and workpiece 30 is obtained. The rotation of the workpiece 30 in direction A causes the knurling wheels to rotate in the opposite direction. Tool 10 is mounted in a suitable tool drive means as is known in the art, and is traversed in direction B parallel to the longitudinal axis 36 of the workpiece 30. Accordingly, knurling begins at first end 32 of the workpiece 34, and continues in direction B toward the second end (not shown). Because the bisector of the teeth included angle (c) and the center plane 24 of the cutting tool 10 are parallel to the longitudinal axis 36 of the workpiece, the diamond-based knurl pattern is aligned in the direction perpendicular to the longitudinal axis 36 of the workpiece 30.

As mentioned above, known knurling tool 10 is capable of imparting a square-based knurl pattern in a workpiece. This is done by arranging the knurling tool as illustrated in FIG. 4. The knurling tool of FIG. 4 differs from that of FIG. 3 only in that knurling wheels 12' and 14' replace wheels 12 and 14, respectively. In first knurling wheel 12', the teeth 44 are oriented from the wheel axis 26 by first teeth incline angle (d). In second knurling wheel 14', the teeth 44 are oriented away from the wheel axis 28 by second teeth incline angle (e). It is known that angles (d) and (e) can both be oriented relative to axes 26, 28 away from the center plane 24 as illustrated, or both towards center plane 24. Accordingly, the included angle (c) formed by the teeth on each wheel is equal to the sum of angles (a) and (d) added to the sum of angles (b) and (e). With the known commercially available tool described above, angles (a) and (b) are each 30°, and angles (d) and (e) are each 15°. This results in the teeth of wheels 12' and 14' each being oriented at 45° from center plane 24. This forms an included angle (c) of 90°. the bisector of which is parallel to center plane 24. The operation of the tool 10 of FIG. 4 is as described above with respect to the tool of FIG. 3.

The pattern imparted by the tool of FIG. 4 will be a square-based pattern which is aligned in the direction perpendicular to the longitudinal axis 36 of the workpiece 30. This pattern is illustrated in FIG. 13. The knurl pattern will comprise pyramids 60 extending outward from the surface of the workpiece. Pyramids 60 will have peaks 62, side edges 64, and side surfaces 66. The base of each pyramid is defined by base edges 68. It is the 90° angle (c) which causes the base edges 68 to form a square. And because the angle (c) is centered on plane 24, the pyramidal pattern is aligned perpendicular to the longitudinal axis 36 of the workpiece 30. This can be seen by noting the peaks 62a, 62b of adjacent pyramids 60 are aligned on a line perpendicular to the longitudinal axis 36 of the workpiece 30.

While the just-described commercially available knurling tool is purported to be a cut knurling tool, careful observation by the present inventors has determined that, surprisingly, the second cutting wheel 14 does not cut a pattern into the workpiece by removing metal chips, but instead cold forms a pattern. In this regard, the known apparatus and method does not perform as a true cut knurling tool as that term is used herein to describe a knurling process in which both knurling wheels cut metal by removing chips. The actual operation of the known knurling method is explained with reference to FIGS. 5–8.

FIGS. 5 and 6 illustrate the orientation of first knurling wheel 12 relative to the workpiece 30. For clarity, the remainder of tool 10 is not illustrated. As seen in FIG. 11, clearance angle α is formed between the ridges 48 of teeth 44 and the workpiece surface. As seen in FIG. 3, rotation of the workpiece 30 in direction A causes first knurling wheel 12 to rotate in direction of motion $M_1$. The workpiece rotation A can be resolved into two components: 1) wheel motion $M_1$; and 2) tangential motion $T_1$ relative to the surface of the workpiece. Tangential motion $T_1$ is parallel to the longitudinal axis 36 of the workpiece and is in the direction to cause teeth 44 to first engage the workpiece with edge 46, thus causing cut knurling. It call be seen that tangential component of motion $T_1$ is equal to sin(a). As angle (a) approaches zero, the tangential component $T_1$ approaches zero, thus the relative motion of the cutting edge 46 of the knurling teeth to the workpiece surface also approaches zero.

As seen in FIG. 5, the relative motion of the workpiece and the first wheel 12 is such that the workpiece is first engaged by the leading edge 46 of each of the respective teeth 44. FIG. 11 is an enlarged partially schematic view illustrating this engagement. The relative motion is indicated by arrows C. It is the edge 46 at the intersection of teeth side surfaces 52 with major surface 42 which acts as a cutting edge to remove material from the surface 34 of the workpiece. Rake angle β is seen to be inclined in the direction of travel of the cutting edge 46. This is referred to as "negative rake angle" and is not as efficient as a positive rake angle, in which the rake angle is inclined away from the direction of travel of the cutting edge. FIGS. 3, 5, 6, and 11 illustrate that first cutting wheel 12 actually performs cut knurling. This is so for sufficiently large values of angle (a) such that tangential motion $T_1$ is large enough to cause cut knurling.

FIGS. 7 and 8 illustrate the orientation of second knurling wheel 14 relative to the workpiece 30. For clarity, the remainder of tool 10 is not illustrated. As seen in FIG. 12, clearance angle a is formed between the ridges 48 of teeth 44 and the workpiece surface. As seen in FIG. 3, rotation of the workpiece 30 in direction A causes second knurling wheel 14 to rotate in direction of motion $M_2$. Workpiece rotation A can be resolved into two components: 1) wheel motion $M_2$; and 2) tangential motion $T_2$ relative to the surface of the workpiece. Tangential motion $T_2$ is parallel to the longitudinal axis 36 of the workpiece, and is in the direction such that the edge 46 of the teeth 44 is not the first element of teeth 44 to engage the workpiece. It can be seen that tangential component of motion $T_2$ is equal to sin(b). As angle (b) approaches zero, the tangential component $T_1$ approaches zero.

As seen in FIG. 7, the relative motion of the workpiece and the second wheel 14 is such that the workpiece is first engaged by the ridge 48 of the tooth rather than the edge 46. FIG. 12 is an enlarged partially schematic view illustrating this engagement. The relative motion is indicated by arrows C. Edge 46 at the intersection of teeth side surfaces 52 with major surface 42 is actually dragged behind the direction of relative motion. Accordingly, the workpiece is first engaged by the ridge 48 away from edge 46. This causes the second wheel 14 to press or form rather than cut and remove material from the workpiece 30.

Thus it is seen that there is a need for a knurling apparatus and method which actually cut knuris a workpiece. There is also a need to provide a knurling apparatus and method in which the knurling pattern does not align itself in the direction perpendicular to the longitudinal axis of the workpiece. Additionally, there is a need to provide a workpiece that can be used to make economically an uninterrupted production tool of any desired length. There is a further need to provide a cut knurling wheel which provides a positive rake angle.

SUMMARY OF THE INVENTION

One aspect of the present invention presents a method of knurling a workpiece such that the knurl pattern is not aligned in the direction perpendicular to the longitudinal axis of the workpiece. The method comprises the steps of:

a) imparting a first plurality of grooves to a workpiece, wherein the first plurality of grooves have a first groove helix angle with respect to a reference plane normal to the longitudinal axis of the workpiece; and b) imparting a second plurality of grooves to the workpiece, wherein the second plurality of grooves have a second groove helix angle with respect to the reference plane. The second plurality of grooves intersects the first plurality of grooves, thereby imparting a knurl pattern to the outer surface of the workpiece. The pattern imparted by the method is continuous and uninterrupted around the circumference of the workpiece, and the first and second groove helix angles are of substantially unequal magnitude.

The above method can form, among other patterns, a plurality of pyramids on the outer surface of the workpiece, each of said pyramids including first opposed side surfaces formed by the first grooves and second opposed side surfaces formed by the second grooves. In one embodiment, the pyramids are truncated pyramids. This method includes both cut knurling and form knurling.

Another aspect of the present invention presents a knurled workpiece formed by the just-described method.

A further aspect of the present invention presents a method of molding a molded article with the workpiece made by the above-described method. The method of molding a molded article comprises the steps of:

a) applying a moldable material to the outer surface of the workpiece;

b) while the moldable material is in contact with the workpiece, applying sufficient force to the moldable material to impart the inverse of the pattern on the outer surface of the workpiece to a first surface of the moldable material in contact with the workpiece; and c) removing the moldable material form the workpiece.

The above method can be used to make a molded article of any desired length, in which the inverse of the knurl pattern imparted to the molded article is continuous and uninterrupted for the length of the molded article. Such a method comprises the additional step of:

d) rotating the workpiece at least 1 revolution concurrently with steps a) through c) to thereby mold an article having a length greater than the circumference of the workpiece, wherein the pattern imparted to the molded article its continuous and uninterrupted along its length.

Another aspect of the present invention presents a molded article made according to the just-described methods.

Yet another aspect of the present invention presents a knurled workpiece in which the knurl pattern is not aligned in the direction perpendicular to the longitudinal axis of the cylindrical workpiece. The knurled workpiece comprises:

a cylindrical body having a longitudinal axis and an outer cylindrical surface, said outer surface having a knurl pattern thereon;

wherein said knurl pattern comprises a first plurality of grooves, said first plurality of grooves having a first groove helix angle with respect to a reference plane normal to said longitudinal axis of said workpiece;

a second plurality of grooves, said second plurality of grooves having a second groove helix angle with respect to said reference plane, said second plurality of grooves intersecting said first plurality of grooves; and wherein said knurl pattern is continuous and uninterrupted around the circumference of said workpiece, and wherein said first and second groove helix angles are of substantially unequal magnitude.

In one embodiment, the intersection of the first and second grooves forms a plurality of pyramids on said outer surface of said workpiece, each of said pyramids including first opposed side surfaces formed by said first grooves and second opposed side surfaces formed by said second grooves. The pyramids can be truncated pyramids.

Also presented is a method of molding a molded article with the just-described knurled workpiece. The method comprises the steps of:

a) applying a moldable material to the outer surface of the knurled workpiece;

b) while the moldable material is in contact with the knurled workpiece, applying sufficient force to the moldable material to impart the inverse of the pattern on the outer surface of the knurled workpiece to a first surface of the moldable material in contact with the knurled workpiece; and c) removing the moldable material from the knurled workpiece.

This method can be used to mold a molded article of any desired length in which the inverse of the knurled pattern imparted to the molded article is continuous and uninterrupted for the length of the molded article. This method comprises the further step of:

d) rotating the knurled workpiece at least 1 revolution concurrently with steps a) through c), to thereby mold an article having a length greater than the circumference of the knurled workpiece, wherein the pattern imparted to the molded article its continuous and uninterrupted along its length. Also presented is a molded article made according to the just-described method.

A still further aspect of the present invention presents a method of cut knurling a workpiece. The method comprises the steps of:

a) rotating the workpiece in a first rotational direction about its longitudinal axis, b) engaging the workpiece with a first knurling wheel, wherein the first knurling wheel includes a plurality of teeth on a working surface of the knurling wheel, the teeth each including a cutting edge on a first end thereof, and wherein the first knurling wheel is configured so as to engage the workpiece with the cutting edge of the teeth;

c) traversing the first knurling wheel in a direction parallel to the longitudinal axis of the workpiece, thereby forming a first plurality of grooves in the workpiece;

d) disengaging the first knurling wheel form the workpiece;

e) rotating the workpiece in a second rotational direction opposite to the first rotational direction;

f) engaging the workpiece with a second knurling wheel, wherein the second knurling wheel includes a plurality of teeth on a working surface of the knurling wheel, the teeth each including a cutting edge on a first end thereof, and wherein the second knurling wheel is configured so as to engage the workpiece with the cutting edge of the teeth; and g) traversing the second knurling wheel in a direction parallel to the longitudinal axis of the workpiece, thereby forming a second plurality of grooves in the workpiece, the second plurality of grooves intersecting the first plurality of grooves, thereby imparting a pattern to the outer surface of the workpiece, wherein the pattern is continuous and uninterrupted around the circumference of the workpiece.

Also presented is a workpiece made according to the just-described method, a method of molding a molded article with a knurled workpiece made according to the just-described method.

Still another aspect of the present inventions presents methods and apparatuses of making structured abrasive articles with the molded articles described herein, and such abrasive articles.

BRIEF DESCRIPTION OF THE DRAWINGS

The present invention will be further explained with reference to the appended Figures, wherein like structure is referred to by like numerals throughout the several views, and wherein:

FIG. 17 is a view like FIG. 15, showing a second step of the method according to the present invention;

FIG. 18 is a top view of the apparatus and workpiece of FIG. 17;

FIG. 19 is a plan view of the pattern imparted on the workpiece by the apparatus and method of the present invention;

FIG. 20 is a partial cross-sectional view taken along line 20—20 of the workpiece of FIG. 19;

FIG. 21 is a partial cross sectional view of a knurling wheel according to the present invention;

FIG. 22 is an enlarged view of the knurling wheel of FIG. 21 engaging a workpiece;

FIG. 23 is a partially schematic view of an apparatus and method for making a production tool according to the present invention;

DETAILED DESCRIPTION OF THE INVENTION

The present invention provides novel methods and apparatuses for knurling a workpiece. The resulting workpieces may be used to manufacture an improved production tool for making structured abrasive articles. Of course, the methods and apparatuses described herein may be used to knurl workpieces for other purposes, and for making articles from the workpieces other than the production tools described herein.

KNURLRNG METHOD AND APPARATUS

Figures 1, 2:
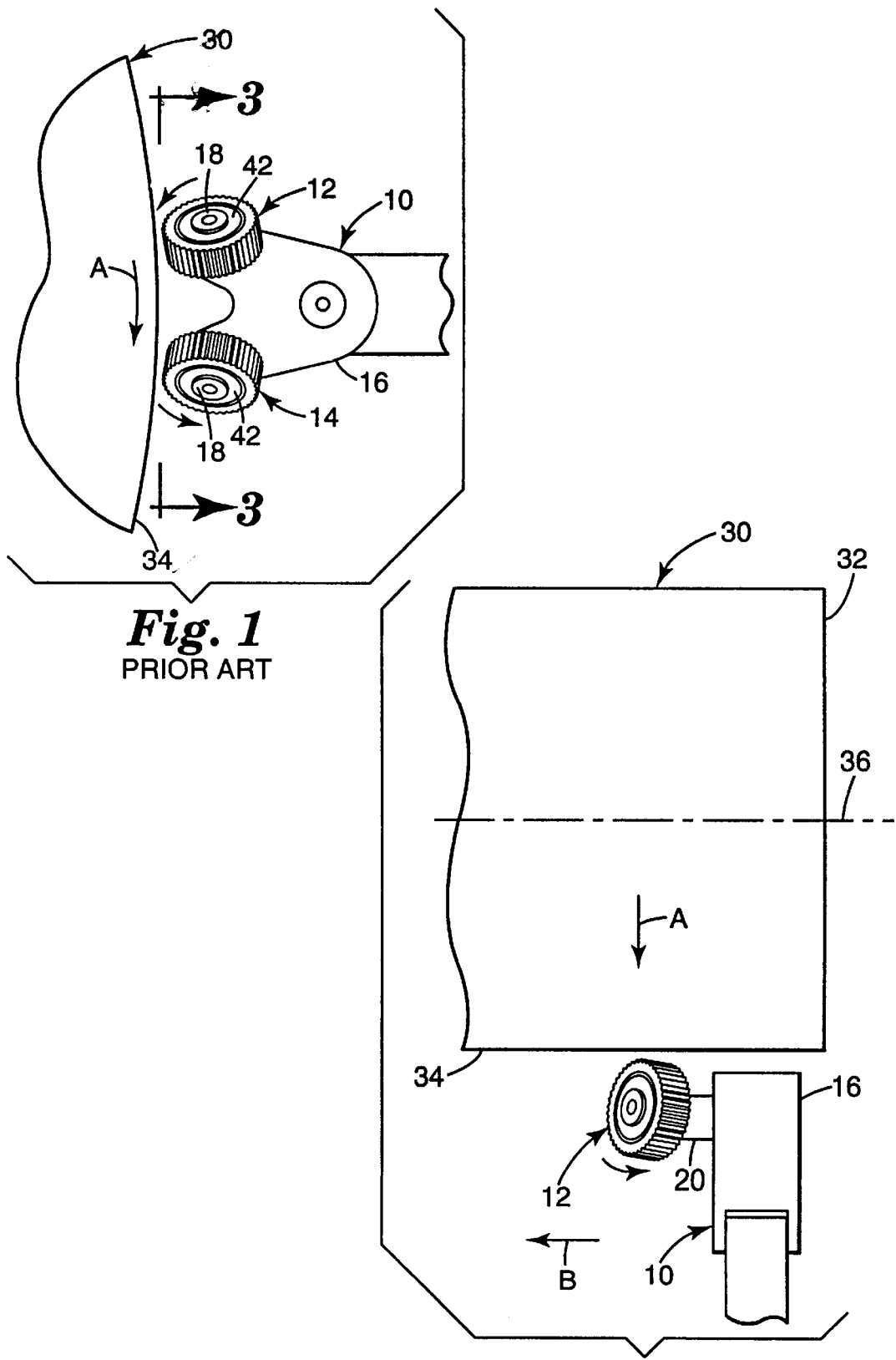
FIG. 1 is a partially schematic end view of a known apparatus and method for knurling a workpiece.
FIG. 2 is top view of the apparatus of FIG. 1.
Figure 3:
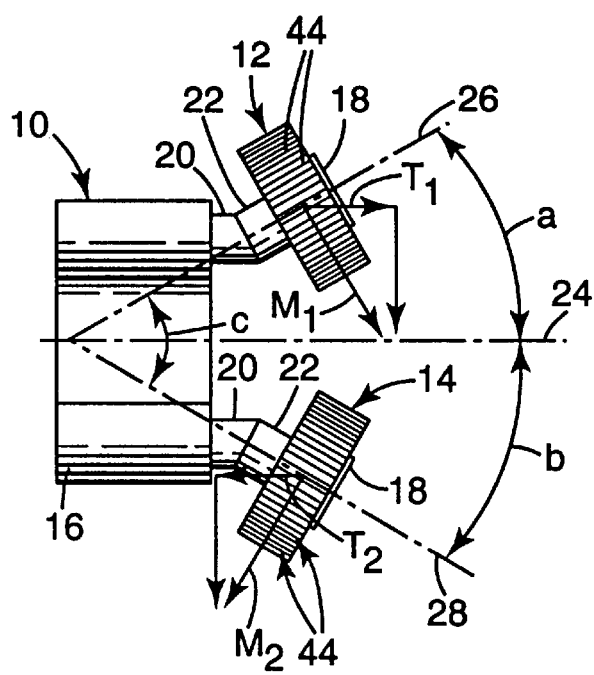
FIG. 3 is an elevational view taken along Line 3—3 of FIG. 1 of a known knurling tool and two knurling wheels.
Figure 4:
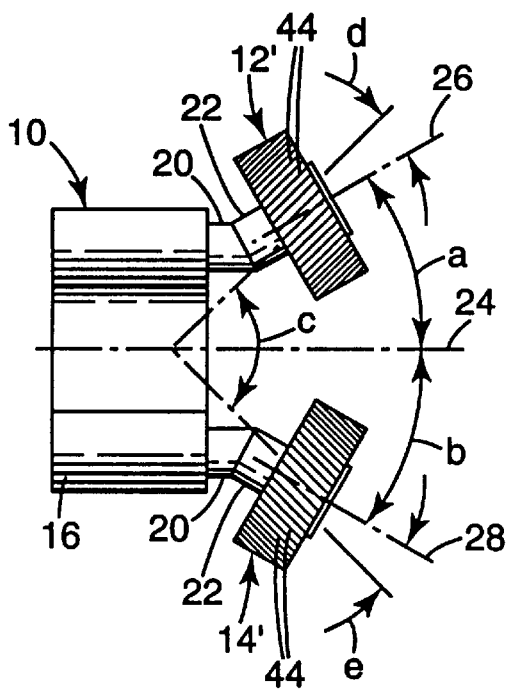
FIG. 4 is a view like FIG. 3, showing an alternative embodiment of known knurling wheels.
Figure 5:
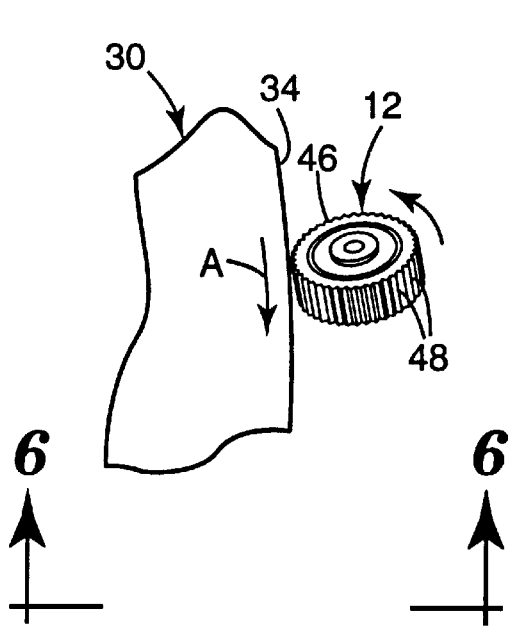
FIG. 5 is a view of a first known knurling wheel engaging a workpiece in a known manner, with the holder removed for clarity.
Figure 6:
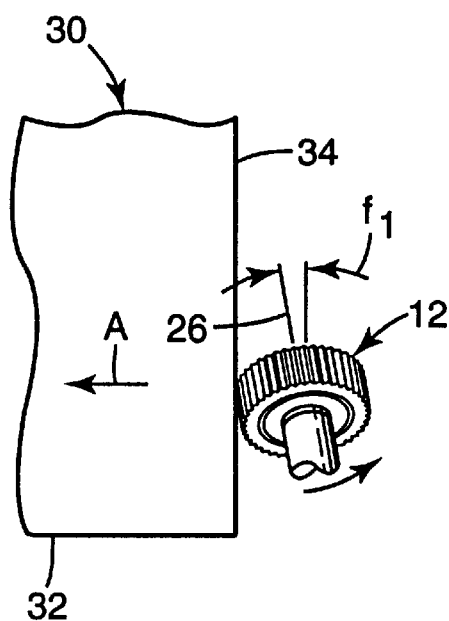
FIG. 6 is a view taken in direction 6 of the wheel of FIG. 5.
Figure 7:
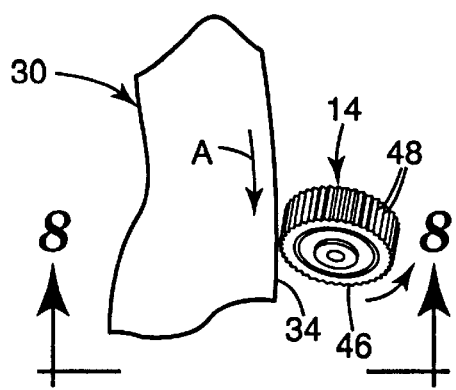
FIG. 7 is a view of a second known knurling wheel engaging a workpiece in a known manner, with the holder removed for clarity.
Figure 8:
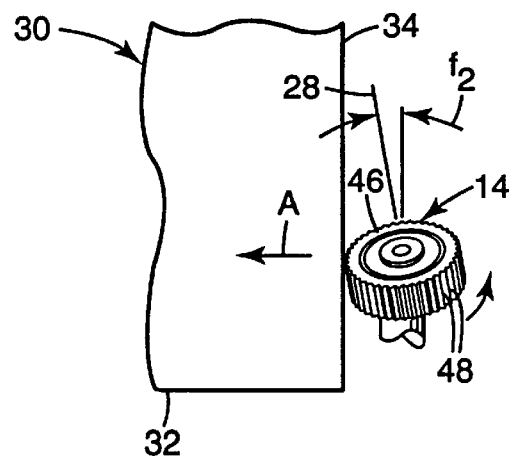
FIG. 8 is a view taken in direction 8 of the knurling wheel of FIG. 7.
Figure 14:
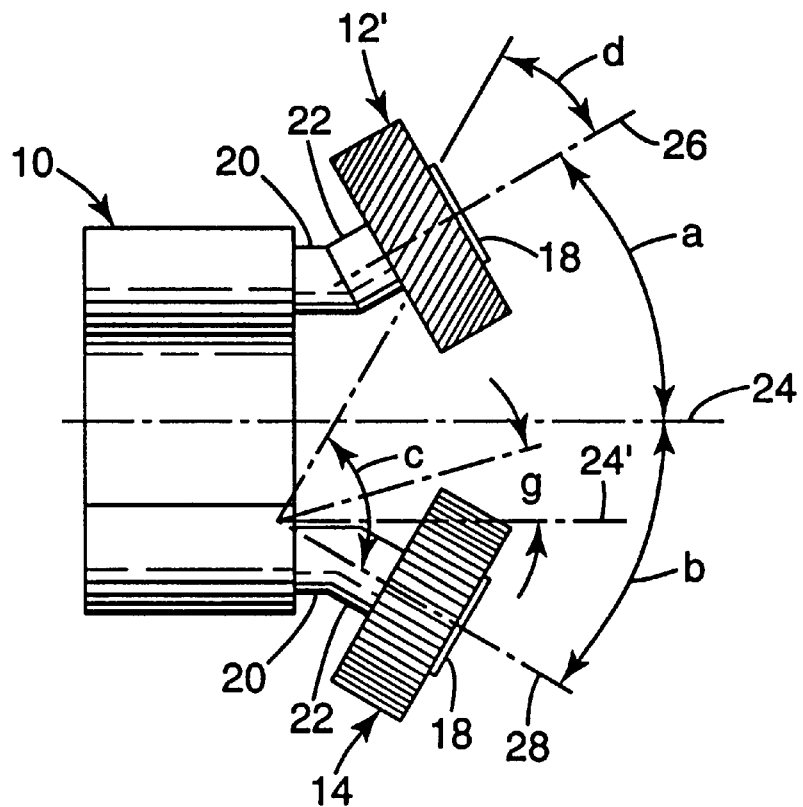
FIG. 14 is an elevation view of the knurling tool according to the present invention.

Referring to FIG. 14, there is seen a knurling tool 10 according to one preferred embodiment of the present invention. Knurling tool 10 is used to knurl a pattern into the outer cylindrical surface 34 of workpiece 30. First knurling wheel 12' and second knurling wheel 14 are mounted onto knurling wheel holder 16. Tool holder 16 includes a pair of mounting posts which each comprise first portion 20 and second portion 22. Cap screw 18 is inserted through the central opening of the knurling wheel and fastened into the second portion of the mounting post 22. First and second wheels 12' and 14 are free to rotate about axes 26 and 28 respectively. The knurling wheel holder 16 has center plane of symmetry 24. The first mounting post portions 20 are parallel to plane 24. The second mounting post portions 22 are oriented at an angle from the center plane 24. This arrangement orients axis of rotation 26 of the first knurling wheel 12' at angle (a) relative to the center plane 24. Angle (a) is defined as the angle between a plane perpendicular to the plane of the page and including axis 26 and center plane 24 perpendicular to the page. The axis of rotation 28 of second wheel 14 is oriented at angle (b) relative to the center plane 24. Angle (b) is defined as the angle between a plane perpendicular to the plane of the page and including axis 28 and center plane 24 perpendicular to the page. As with the prior art tool illustrated in FIGS. 3, 6, and 8, the orientation of the second portion of the mounting posts causes the axis 26 of the first knurling wheel to be inclined towards the workpiece 30 by angle ($f_1$) and causes the axis 28 of the second knurling wheel to be inclined towards the workpiece 30 by angle ($f_2$). Knurling tool 10 is configured to allow each mounting post to rotate about the longitudinal axes of its respective first portion 20. Such rotational adjustments are calibrated to the diameter of the workpiece 30. The adjustments are intended to orient angles (a), (b), ($f_1$) and ($f_2$) to the particular workpiece to allow cut knurling of various sized workpieces.

Figure 9:
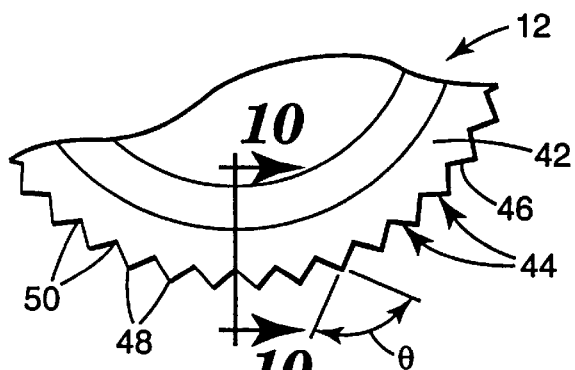
FIG. 9 is a plan view of a known knurling wheel.
Figure 10:
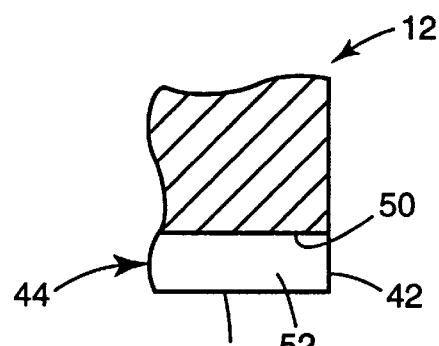
FIG. 10 is a partial cross-sectional view taken along line 10—10 of the wheel of FIG. 9.

As seen in FIGS. 9 and 10, the knurling wheels each have along their outer working surface a plurality of teeth 44. Teeth 44 include tooth ridge 48, tooth valleys 50 and side surfaces 52. Each wheel also includes major opposed surfaces 42 (only one illustrated). Where the side surfaces 52 of the teeth 44 meet the major surface 42, an edge 46 is formed. The teeth have a ridge included angle θ.

One preferred tool holder 16 is available commercially from Eagle Rock Technologies Int'l Corp. of Bath, Pa., and is known as Zeus™ Cut-Knurling Tool No. 209. Angles (a) and (b) are typically each 30°, resulting in angle (c) being 60°. As discussed above, this knurling tool 10 is typically provided in a known manner with first and second knurling wheels in which the teeth 44 are oriented parallel to the respective wheel axis 26, 28, or in which the teeth on each wheel are offset an equal amount from axes 26, 28. Accordingly, when the tool 10 is provided in a known manner, the teeth have an included angle (c) which is centered on center plane 24. This arrangement provides a knurling pattern which is aligned in the direction perpendicular to the longitudinal axis 36 of the workpiece as discussed above. In some instances, such an arrangement is desirable for use with the present invention.

Alternatively, as illustrated in FIG. 14, the present invention provides a knurling tool 10 in which the first knurling wheel 12' and second knurling wheel 14 have tooth patterns of different incline angles (d) and (e). For example, wheel 12' is illustrated as having a first wheel teeth incline angle (d) relative to wheel axis 26, and wheel 14 is illustrated as having its teeth aligned with wheel axis 28 such that second wheel teeth incline angle (e) is 0°. The resulting included angle (c) between the teeth is thus the sum of angles (a) and (d) added to angle (b). This causes bisector of angle (c) to be non-parallel to center plane 24 by angle (g) (as illustrated with reference to plane 24' which is parallel to center plane 24). It can be seen that angle (g) is equal to one half of angle (d). The offset angle (g) results in a knurling pattern which is not aligned in the direction perpendicular to the longitudinal axis 36 of the workpiece, but instead has a helix angle (h) relative to the direction perpendicular to the longitudinal axis 36, as will be discussed more fully below.

In one preferred arrangement, the first wheel angle and second wheel angles (a) and (b) are each 30°, the first wheel tooth incline angle (d) is 30°, and second wheel tooth incline angle (e) is 0°. This provides a cutting tooth included angle (c) of 90°, which will impart a square-based knurl pattern on the workpiece. This arrangement also provides an included angle offset from the center plane 24, angle (g), of 15°. This will impart a helix angle (h) on the knurling pattern on the workpiece 30, as best seen in FIG. 19. It would be expected that the offset angle (g) of the teeth included angle (c) would be equal to the helix angle (h) of the pyramids on the workpiece. However, the observations of the present inventors have been that the helix angle (h) on the workpiece has been approximately equal to the tooth offset angle (g), but is typically somewhat smaller than the tooth offset angle (g). It is currently believed that the effect of the non-zero angles ($f_1$) and ($f_2$) causes this small difference between the values of angles (g) and (h).

Other arrangements are also possible. The wheel axis angles (a) and (b) can be any desired angle sufficiently large to maintain cut knurling as described above, and can be equal to one another or not. Either, both, or neither knurling wheel may have a tooth incline angle (d), (e). To provide a non-zero helix angle (h) on the knurl pattern, it is necessary to provide some offset angle (g) to the tooth included angle (c). This can be done by properly selecting the combination of wheel axis angles (a) and (b) with a desired tooth incline offset (d) and (e). If angles (a) and (b) are the same, the tooth incline angles on wheels 12 and 14 must be different. If the tooth inclines are equal, it is necessary to provide unequal wheel angles (a) and (b). If unequal wheel angles (a) and (b) are provided, wheel tooth incline angles (d) and (e) may be the same, or they may be different as long as they do not negate the difference between wheel angles (a) and (b). Also, it will be recognized that it is possible to provide a helix angle (h) to the knurl pattern with a tool 10 having a knurling teeth included angle (c) centered on plane 24 with no offset (g), by rotating the entire tool 10 relative to the longitudinal axis 36 of the workpiece 30.

For a square-based knurl pattern the wheel angles (a) and (b), and the tooth incline angles (d) and (e) must be selected to provide a tooth included angle (c) of 90°. Diamond-based knurl patterns of any desired internal angle may be provided by selecting the wheel angles and tooth inclines to provide an angle (c) of other than 90°. For example, as discussed above, and included angle (c) of 60° will impart a knurl pattern in which the diamond base has opposed 60° corners and opposed 120° corners.

Other commercially available tool holders which may be advantageously employed in the present invention include, but are not limited to, the CNC-107-100 tool, available commercially form Dorian Tool, International of East Bernard, Tex.

Figure 11:
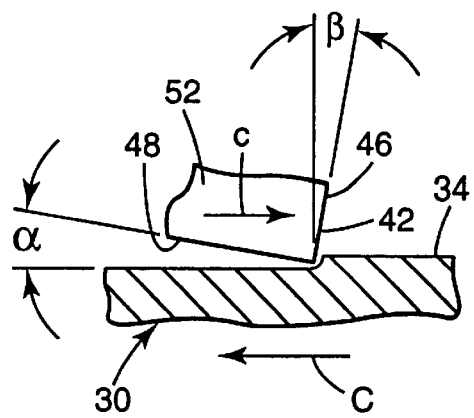
FIG. 11 is an enlarged view of the first known wheel engaging the workpiece when used in a known manner.
Figure 12:
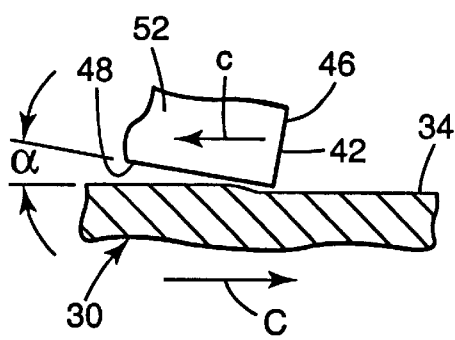
FIG. 12 is an enlarged view of the second known wheel engaging the workpiece when used in a known manner.
Figure 13:
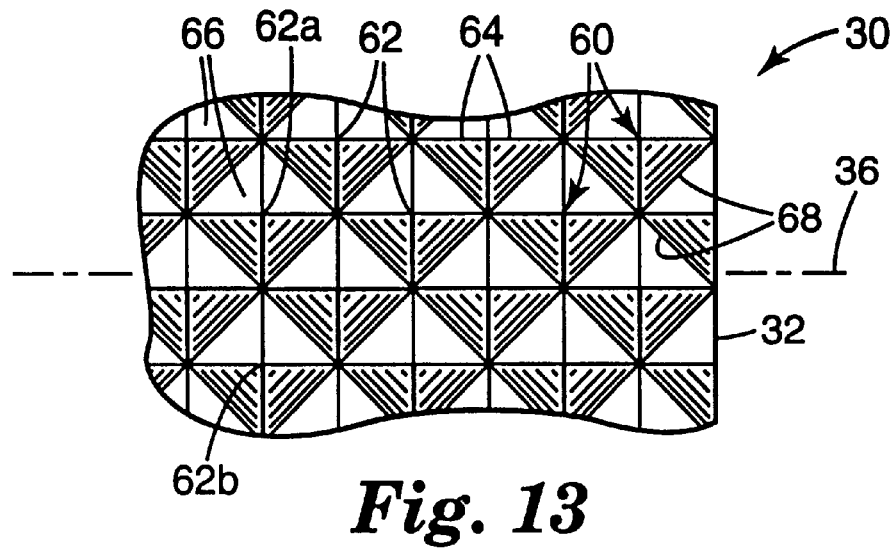
FIG. 13 is a plan view of the pattern imparted on the workpiece by the known knurling tool used in a known manner.
Figure 15:
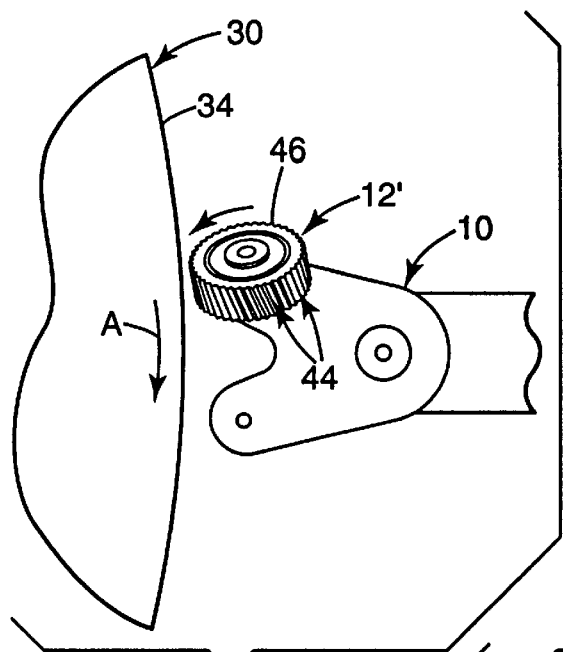
FIG. 15 is a partially schematic end view of an apparatus and one step of a method for knurling a workpiece according to the present invention.
Figure 16:
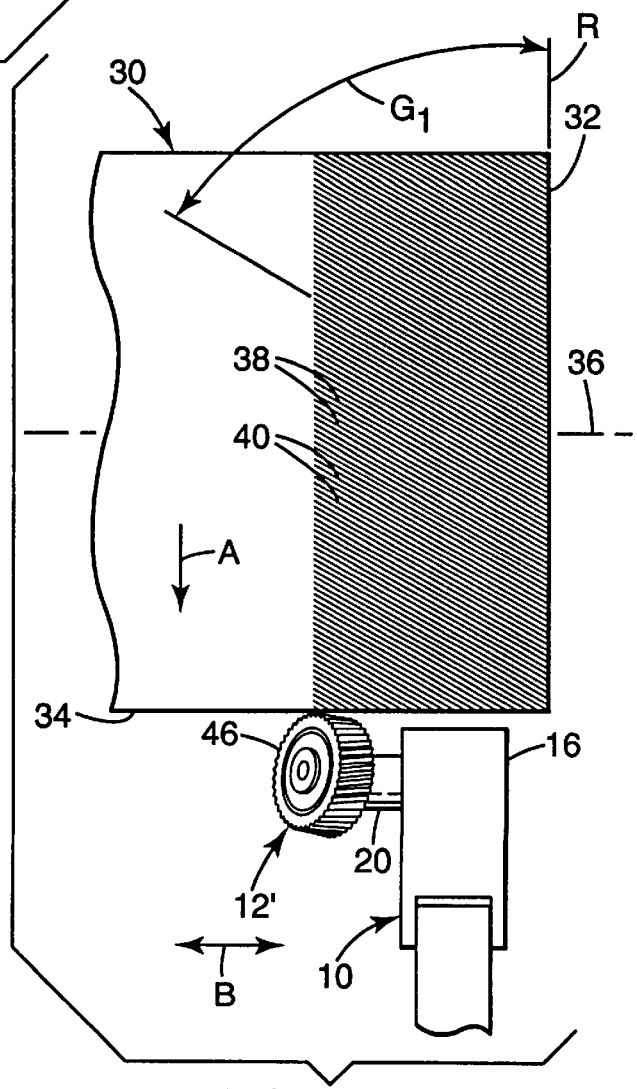
FIG. 16 is a top view of the apparatus and workpiece of FIG. 15.

One preferred method of knurling a workpiece according to the present invention is illustrated in FIGS. 15–18. As seen in FIG. 15, cutting tool 10 is first provided with a first knurling wheel 12' only, without a second knurling wheel. The workpiece 30 is rotated in direction A about its longitudinal axis 36. The tool 10 is then moved towards workpiece 30 until the desired engagement between the knurling wheel and the workpiece is obtained. Rotation of the workpiece in direction A causes the first knurling wheel to rotate in the opposite direction. As seen in FIG. 16, the tool 10 is traversed in direction B parallel to the axis 36 of the workpiece, starting at first end 32. The teeth 44 on first wheel 12' will then form a first helical groove pattern in the outer surface 34 of the workpiece. The engagement of the cutting edge 46 of the knurling teeth with the workpiece is illustrated in FIG. 11. As explained with reference to FIG. 3, the rotation of the workpiece 30 drives the knurling wheel in direction $M_1$ which has a tangential motion component $T_1$ relative to the surface of the workpiece in the direction to cause the edge 46 of the knurling teeth 44 to first engage the workpiece 30. This causes wheel 12' to cut knurl when used as described with reference to FIGS. 15 and 16. For a small value of clearance angle $\alpha$ and rake angle $\beta$, the groove angle of the first plurality of grooves cut in the workpiece will be approximately equal to the ridge included angle $\theta$ of the knurling tooth. The helical grooves in the workpiece will have first ridges 38 corresponding to the cutting wheel tooth valley 50. The grooves will also have first valleys 40 corresponding to the first wheel tooth ridges 48. The first grooves will have a helix angle substantially equal to the sum of the first wheel angle (a) and tooth incline angle (d). The first groove helix angle is illustrated in FIG. 16 as angle $G_1$ measured as positive when counterclockwise from reference R which is perpendicular to the longitudinal axis 36 of the workpiece. The value of helix angle $G_1$, and all helix angles referred to herein, is defined as follows. The lead of the helix is first measured as the distance the helix advances in one revolution. The helix angle is then defined as the arc tangent of $\pi$ times the diameter of the helix divided by the lead of the helix. The helical angles as illustrated in the appended Figures have been somewhat simplified, and are indicated for illustrative purposes. In one preferred embodiment, tool holder 16 is configured to have a first wheel angle (a) of 30° and a first wheel tooth incline angle (d) of 30°, such that the first grooves will have a helix angle $G_1$ substantially equal to 60°. The clearance angle $\alpha$ and the direction of relative motion between the workpiece 30 and the first knurling wheel 12' which causes cutting engagement by edge 46 is primarily determined by the direction of rotation A rather than relatively small traverse rate in direction B. Accordingly, it is also possible to traverse the tool 10 in the direction from second end of the workpiece 30 to the first end 32 to cut knurl the first helix groove pattern.

After the first grooves are formed, the first wheel 12' is removed, and second wheel 14 is attached to the holder 16 as illustrated in FIG. 17. Workpiece 30 is now rotated in direction A' opposite to that when first wheel 12' was present. The tool 10 is then moved towards workpiece 30 until the desired engagement between the second knurling wheel 14 and the workpiece is obtained. Rotation of the workpiece in direction A' causes the second knurling wheel to rotate in the opposite direction. As seen in FIG. 18, the tool 10 is traversed in direction B parallel to the axis 36 of the workpiece, starting at first end 32. The teeth 44 on first second wheel 14 will then form a second helical groove pattern in the outer surface 34 of the workpiece. These grooves will cross the first grooves. The engagement of the cutting edge 46 of the knurling teeth with the workpiece is seen in FIG. 11. Referring back to the description of wheel 14 when used in the conventional manner described in FIG. 3, it is seen that tangential motion $T_2$ causes the wheel to form knurl rather than cut knurl when used in the conventional manner. However, when the workpiece is rotated in direction A' in accordance with the present invention, the rotation of the workpiece drives the second wheel to rotate in direction $M_2$ opposite to that of the known manner shown in FIG. 3. This reversed motion component $M_2$ of the wheel has a tangential component $T_2$ relative to the surface of the workpiece and parallel to the longitudinal axis 36 in the direction causing the edge 46 of the teeth to first engage the workpiece, thus allowing the wheel 14 to cut knurl when used in accordance with the present invention. This provides cut knurling for both of the first and second knurling wheels. As discussed above, for a small value of clearance angle $\alpha$ and rake angle $\beta$, the angle of the groove cut in the workpiece will be approximately equal to the ridge included angle $\theta$ of the knurling tooth. The second helical grooves in the workpiece will have second ridges 38' corresponding to the cutting wheel tooth valley 50. The second grooves will also have second valleys 40' corresponding to the first wheel tooth ridges 48. The helix angle of the second grooves will be substantially equal to the sum of the second wheel angle (b) and the second wheel tooth incline angle (e). This is illustrated in FIG. 18 as second groove helix angle $G_2$ measured as positive when clockwise from reference R. In one preferred embodiment, tool holder 16 is configured to have a second wheel angle (b) of 30° and a second wheel tooth incline angle (e) of 0°. The second grooves will then be perpendicular to the first grooves, forming a square-based knurl pattern on the workpiece 30. As with the first cutting wheel, the clearance angle $\alpha$ and the direction of relative motion between the workpiece 30 and the second knurling wheel 14 which causes cutting engagement by edge 46 is primarily determined by the direction of rotation A' rather than relatively small traverse rate in direction B. Accordingly, it is also possible to traverse the tool 10 in the direction from second end of the workpiece 30 to the first end 32 to cut knurl the second helix groove pattern.

The ability to perform true cut knurling with the above apparatus and method provides the following advantages over form knurling Cut knurling allows imparting a knurl pattern in harder workpieces than is possible with form knurling. This allows for the use of harder, more corrosion resistant materials for the workpiece 30. Additionally, cut knurling can be performed with less force applied to the workpiece by the tool holder than with form knurling. This makes for easier manufacturing, and reduces the wear and distortion on the tool holder and workpiece. Cut knurling also does not increase the outer diameter of the workpiece 30 as happens with form knurling. Furthermore, cut knurling provides better defined grooves in the workpiece than does form knurling, providing the capability to better control the size and configuration of the pyramids 60. Also, cut knurling is able to easily create groove geometries other than the V-shaped grooves just described, while form knurling is not well suited for creating groove geometries which would require pressing or cold forming a substantial amount of material in the workpiece.

The rotational rate of the workpiece, advance rate of the knurling tool, and cutting depth can be selected to provide the desired results. The following parameters have been found to be useful, although the present invention is not thereby limited: workpiece rotational speed of 50 to 100 r.p.m.; tool advance per revolution of workpiece is from 0.13 to 0.25 mm (0.005 to 0.010 in); and knurl groove depths of from 0.25 to 0.91 mm (0.010 to 0.036 in). The full desired depth of the grooves may be obtained in a single pass with the knurling tool, or multiple passes of increasing depth may be made until the desired groove depth is obtained. Furthermore, where it is desired that the first and second grooves have the same depth, this may be easier to obtain by the method just described, in which one knurling wheel is used at a time. Knurling is preferably done in the presence of a suitable lubricant/coolant introduced onto the workpiece at the knurling wheels as is well known in the art.

The knurl pattern formed by the just-described method and apparatus is illustrated in FIG. 19. The knurl pattern comprises a plurality of pyramids 60 projecting from the workpiece 60. The pyramids each comprise peak 62, side edges 64 extending from the peak, base edges 68, and sides surfaces 66 bounded by the side edges and base edges. When cutting tool 10 is configured to have a tooth included angle (c) with a bisector that is non-parallel to the center plane 24 by angle (g), this will impart a helix angle (h) approximately equal to angle (g) on the knurling pattern as illustrated in FIG. 19. That is, the helix angle (h) is oblique (not 0° or 90°) in contrast to prior knurl patterns which are aligned around the circumference of the workpiece in a direction perpendicular to the longitudinal axis of the workpiece. A cross section of the pyramids 60 is illustrated in FIG. 20. The first plurality of grooves have groove sides 66$a$ which are intersected by the second plurality of grooves having groove sides 66$b$. The intersection of the two sets of grooves thus forms the pyramids 60. Each pyramid has a pair of opposed sides 66$a$ formed by adjacent first grooves and a pair of opposed sides 66$b$ formed by adjacent second grooves. It is seen that the grooves cut by the knurling teeth 40 have an angle θ that will be substantially equal to the ridge included angle θ of the knurling teeth for a small value of clearance angle α and rake angle β. The pyramid peaks will then have an internal angle of φ, which will be equal to θ. In one preferred embodiment, the knurling wheel tooth angle θ is 90°, resulting in a pyramid peak internal angle φ of 90°. Tooth angle θ other than 90° may be used, imparting a pyramid peak included angle φ of other than 90°.

The knurl pattern is illustrated herein as having pyramidal peaks which come to a point at 62. This occurs when the cutting wheel teeth 44 are engaged to their full depth into the workpiece, engaging the workpiece to their full extent at edge 46 from ridge 48 to valley 50. Other patterns are also attainable with the present invention. For example, truncated pyramids, that is pyramids with flat tops rather than pointed peaks 62, can be made by engaging the knurling teeth 44 for only a portion of their depth. By engaging the teeth 44 to a partial depth, the edge 46 will not engage all the way up to tooth valley 50. This will leave a portion of outer surface 34 of workpiece 30 in its original, unknurled condition, providing a truncated top to the pyramids 60. It is also possible to use teeth 44 configured to have flat or curved spaces between the teeth 44 at valley 50, or a flat or other configuration at 48 rather than an edge ridge.

Knurl patterns having a non-zero helix angle (h) can also be obtained in accordance with the present invention by form knurling. In such an arrangement, the knurling tool 10 and knurling wheels 12, 14 are configured such that edge 46 does not have a sufficiently large tangential component of motion $T_1$ or $T_2$ relative to the workpiece 30. Thus, rather than being cut with tooth edge 46, the knurl pattern is pressed or formed by the ridge 48 of the teeth. To form or press the knurl the pattern with a helix angle (h), the angles (a), (b), (d) and (e) are selected as described herein so that the bisector of teeth included angle (c) is non-parallel to center plane 24 to provide offset angle (g).

An alternate embodiment of the knurling wheel 12 according to the present invention is illustrated in FIG. 21. In this embodiment, the major surface 42 of the knurling wheel has been undercut at 54. Undercut 54 is illustrated as an arcuate surface extending around the full circumference of wheel 12. The undercut provides an improved rake angle β as illustrated in FIG. 22. The undercut 54 can instead be flat or any other configuration to provide a zero or positive rake angle. The undercut 54 preferably extends to ridge 48 in one direction, and extends far enough inward from ridge 48 to improve the cutting characteristics of edge 46 and major surface 42, preferably at least as far as tooth valley 50. A zero or positive rake angle β provides more efficient cutting than the negative rake angle described above with respect to known cutting wheels and also reduces the amount of burring of the workpiece.

While the knurling teeth 44 are illustrated herein as forming a ridge at 48 and a valley at 50, knurling teeth of other profiles can be advantageously used with the present invention. For example, rather than coming to a line or edge at ridge 48 and valley 50, the ridge 48 or valley 50 can instead comprise a flat surface, rounded surface, or other contour. Also, teeth side surfaces 52 can be curved or other profiles rather than planar. These alternate tooth configurations are better suited for use with cut knurling rather than form knurling, although certain configurations may be used under some conditions with form knurling.

MOLDED ARTICLE

One preferred method of using workpiece, or master tool, 30 to fabricate a molded article such as a production tool, is illustrated in FIG. 23. The production tool 82 is fabricated by extruding at station 100 a moldable material, preferably a thermoplastic material, onto the knurled outer surface 34 of master tool 30. The thermoplastic material is forced against surface 34 at nip 102. Production tool 82 is then peeled away from the master tool 30 and wound onto mandrel 106. In this manner, a production tool 82 of any desired length may be obtained. The molding surface 86 will have the inverse of the pattern on the knurled outer surface 34 of master tool 30.

Figure 24:
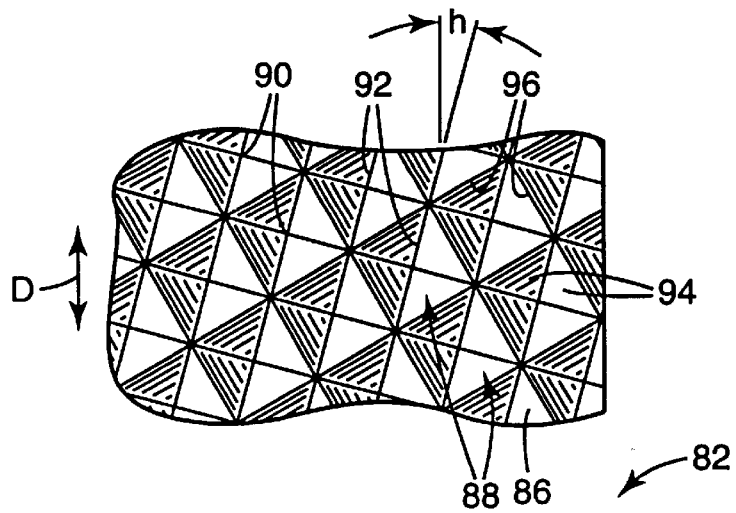
FIG. 24 is a plan view of the production tool of FIG. 23.

When the pattern imparted on outer surface 34 of master tool 30 is a positive of the pattern of the ultimate fabricated structured abrasive article (or other article as desired), the pattern on mold surface 86 will be the inverse of the pattern of the ultimate article. As seen in FIG. 24, the production tool mold surface 86 comprises a plurality of pyramidal pockets 88 which are the inverse of the pyramids 60 on master tool 30. Pyramidal pockets include bottom point 90, side edges 92, side surfaces 94, and upper edges 96. When the master tool 30 has a knurl pattern with a helix angle (h), the pyramidal pocket pattern in the molded article will have an angle (h) relative to the longitudinal axis of the article of equal magnitude and opposite direction the angle (h) on the master tool. Back surface 84 is relatively flat and smooth. It may be desired that production tool 82 is the ultimate fabricated article, in which case the pattern on the outer surface 34 of master tool 30 will be the negative or inverse of the desired ultimate pattern on production tool 82.

Thermoplastic materials that can be used to construct the production tool 82 include polyesters, polycarbonates, poly (ether sulfone), polyethylene, polypropylene, poly(methyl methacrylate), polyurethanes, polyamides, polyvinylchloride, polyolefins, polystyrene, or combinations thereof. Thermoplastic materials can include additives such as plasticizers, free radical scavengers or stabilizers, thermal stabilizers, antioxidants, ultraviolet radiation absorbers, dyes, pigments, and other processing aides. These materials are preferably substantially transparent to ultraviolet and visible radiation.

Because the workpiece, or master tool, 30 has a continuous, uninterrupted knurled pattern around its circumference, a production tool of any desired length in direction D may be economically molded without seams or interruptions on the molding pattern. This will allow for the production of structured abrasive articles of any length with an uninterrupted structured abrasive composite pattern. Such structured abrasive articles will be less likely to shell or delaminate than other structured abrasive articles which have a seam or interruption in the pattern due to seams in the production tool.

The production tool 82 can also be formed by embossing a moldable material with the knurled master tool 30. This can be done at the required force and temperature so as to impart the mold surface 86 of the production tool with the inverse of the knurl pattern on the workpiece. Such a process can be used with single layer or multiple layer production tools 82. For example, in a multiple layer production tool, the mold surface 86 can comprise a material suitable to be molded into the desired pattern, while the back surface 84 can comprise a suitably strong or durable material for the conditions to which the production tool 82 will be subjected to in use.

The production tool 82 can also be made of a cured thermosetting resin. A production tool made of thermosetting material can be made according to the following procedure. An uncured thermosetting resin is applied to a master tool 30. While the uncured resin is on the surface of the master tool, it can be cured or polymerized by heating such that it will set to have the inverse shape of the pattern of the surface of the master tool. Then, the cured thermosetting resin is removed from the surface of the master tool. The production tool can be made of a cured radiation curable resin, such as, for example acrylated urethane oligomers. Radiation cured production tools are made in the same manner as production tools made of thermosetting resin, with the exception that curing is conducted by means of exposure to radiation e.g. ultraviolet radiation.

While the inventive methods and apparatuses described herein are particularly well suited for use in manufacturing structured abrasives, the present invention is not thereby limited. For example, the inventive knurling methods and apparatuses described herein may be used on a workpiece 30 that is the ultimate manufactured article having its own use, rather than a master tool to be used in subsequent processes. Additionally, when the workpiece is a master tool, its use is not limited to making a production tool for use in subsequent processes. That is, the molded article which is molded with the knurled workpiece may be the ultimate manufactured article having its own use. Furthermore, the knurled workpiece 30 can be used as a rotogravure coater for making abrasive or other articles.

METHOD OF MAKING A STRUCTURED ABRASIVE ARTICLE

The first step to make the abrasive coating is to prepare the abrasive slurry. The abrasive slurry is made by combining together by any suitable mixing technique the binder precursor, the abrasive particles and the optional additives. Examples of mixing techniques include low shear and high shear mixing, with high shear mixing being preferred. Ultrasonic energy may also be utilized in combination with the mixing step to lower the abrasive slurry viscosity. Typically, the abrasive particles are gradually added into the binder precursor. The amount of air bubbles in the abrasive slurry can be minimized by pulling a vacuum during the mixing step. In some instances it is preferred to heat the abrasive slurry to a temperature to lower its viscosity as desired. For example, the slurry can be heated to approximately 30° C. to 70° C. However, the temperature of the slurry should be selected so as not to deleteriously affect the substrate to which it is applied. It is important that the abrasive slurry have a rheology that coats well and in which the abrasive particles and other fillers do not settle.

There are two main methods of making the abrasive coating of this invention. The first method generally results in an abrasive composite that has a precise shape. To obtain the precise shape, the binder precursor is at least partially solidified or gelled while the abrasive slurry is present in the cavities of a production tool. The second method generally results in an abrasive composite that has a non-precise shape. In the second method, the abrasive slurry is coated into cavities of a production tool to generate the abrasive composites. However, the abrasive slurry is removed from the production tool before the binder precursor is cured or solidified. Subsequent to this, the binder precursor is cured or solidified. Since the binder precursor is not cured while in the cavities of the production tool this results in the abrasive slurry flowing and distorting the abrasive composite shape.

For both methods, if a thermosetting binder precursor is employed, the energy source can be thermal energy or radiation energy depending upon the binder precursor chemistry. For both methods, if a thermoplastic binder precursor is employed the thermoplastic is cooled such that it becomes solidified and the abrasive composite is formed.

Figure 25:
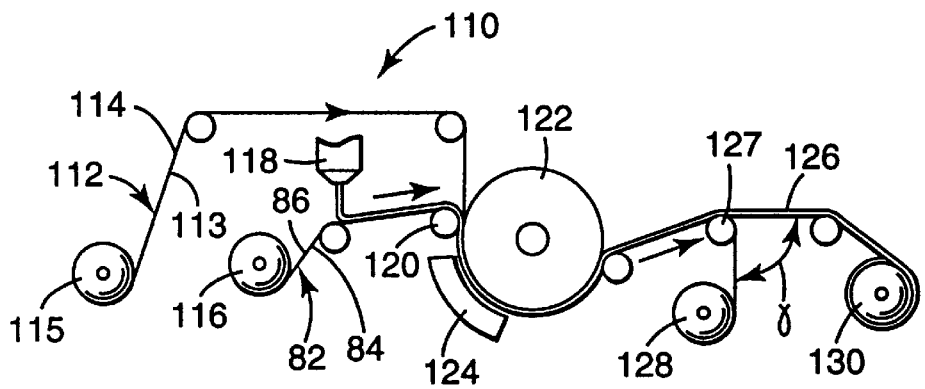
FIG. 25 is a partially schematic view of an apparatus and method for making an abrasive article with the production tool of the present invention.

FIG. 25 illustrates schematically a method and apparatus 110 for making an abrasive article. A production tool 82 made by the process described above is in the form of a web having mold surface 86, back surface 84, and two ends. A substrate 112 having a first major surface 113 and a second major surface 114 leaves an unwind station 115. At the same time, the production tool 82 leaves an unwind station 116. The mold or contacting surface 86 of production tool 82 is coated with a mixture of abrasive particles and binder precursor at coating station 118. The mixture can be heated to lower the viscosity thereof prior to the coating step. The coating station 118 can comprise any conventional coating means, such as knife coater, drop die coater, curtain coater, vacuum die coater, or an extrusion die coater. After the mold surface 86 of production tool 82 is coated, the substrate 112 and the production tool 82 are brought together such that the mixture wets the first major surface 113 of the substrate 112. In FIG. 25, the mixture is forced into contact with the substrate 112 by means of a contact nip roll 120, which also forces the production tool/mixture/backing construction against a support drum 122. It has been found useful to apply a force of 45 pounds with the nip roll, although the actual force selected will depend on several factors as is known in the art. Next, a sufficient dose of energy, preferably radiation energy, is transmitted by a radiation energy source 124 through the back surface 84 of production tool 82 and into the mixture to at least partially cure the binder precursor, thereby forming a shaped, handleable structure 126. The production tool 82 is then separated from the shaped, handleable structure 126. Separation of the production tool 82 from the shaped, handleable structure 126 occurs at roller 127. Examples of materials suitable for production tool 82 include polycarbonate, polyester, polypropylene, and polyethylene. In some production tools made of thermoplastic material, the operating conditions for making the abrasive article should be set such that excessive heat is not generated. If excessive heat is generated, this may distort or melt the thermoplastic tooling. In some instances, ultraviolet light generates heat. Roller 127 can be a chill roll of sufficient size and temperature to cool the production tool as desired. The contacting surface or mold surface 86 of the production tool may contain a release coating to permit easier release of the abrasive article from the production tool. Examples of such release coatings include silicones and flourochemicals. The angle γ between the shaped, handleable structure 126 and the production tool 82 immediately after passing over roller 127 is preferably steep, e.g., in excess of 30°, in order to bring about clean separation of the shaped, handleable structure 126 from the production tool 82. The production tool 82 is rewound on mandrel 128 so that it can be reused. Shaped, handleable structure 126 is wound on mandrel 130. If the binder precursor has not been filly cured, it can then be fully cured by exposure to an additional energy source, such as a source of thermal energy or an additional source of radiation energy, to form the coated abrasive article. Alternatively, full cure may eventually result without the use of an additional energy source to form the coated abrasive article. As used herein, the phrase "full cure" and the like means that the binder precursor is sufficiently cured so that the resulting product will function as an abrasive article, e.g. a coated abrasive article.

After the abrasive article is formed, it can be flexed and/or humidified prior to converting. The abrasive article can be converted into any desired form such as a cone, endless belt, sheet, disc, etc. before use.

Figure 26:
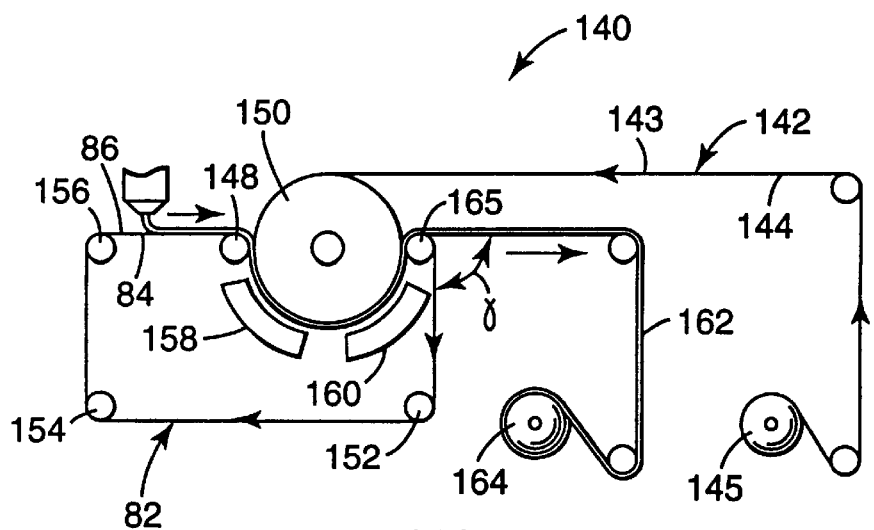
FIG. 26 is a view like FIG. 25 of an alternate embodiment of an apparatus and method.

FIG. 26 illustrates an apparatus 140 for an alternative method of preparing an abrasive article. In this apparatus, the production tool 82 is an endless belt having contacting or mold surface 86 and back surface 84. A substrate 142 having a first major surface 143 and a second major surface 141 leaves an unwind station 145. The mold surface 86 of the production tool is coated with a mixture of abrasive particles and binder precursor at a coating station 146. The mixture is forced against the first surface 143 of the substrate 142 by a contact nip roll 148, which also forces the production tool/mixture/backing construction against a support drum 150, such that the mixture wets the fist major surface 143 of the substrate 142. The production tool 82 is driven over three rotating mandrels 152, 154, and 156. Energy, preferably radiation energy, is then transmitted through the back surface 84 of production tool 82 and into the mixture to at least partially cure the binder precursor. There may be one source of radiation energy 158. There may also be a second source of radiation energy 160. These energy sources may be of the same type or of different types. After the binder precursor is at least partially cured, the shaped, handleable structure 162 is separated from the production tool 82 and wound upon a mandrel 164. Separation of the production tool 82 from the shaped, handleable structure 162 occurs at roller 165 The angle γ between the shaped, handleable structure 162 and the production tool 82 immediately after passing over roller 165 is preferably steep, e.g., in excess of 30°, in order to bring about clean separation of the shaped, handleable structure 162 from the production tool 82. One of the rollers, for example roller 152, can be a chill roll of sufficient size and temperature to cool production tool 82 as desired. If the binder precursor has not been fully cured, it can then be fully cured by exposure to an additional energy source, such as a source of thermal energy or an additional source of radiation energy, to form the coated abrasive article. Alternatively, full cure may eventually result without the use of an additional energy source to form the coated abrasive article.

After the abrasive article is formed, it can be flexed and/or humidified prior to converting. The abrasive article can be converted into any desired form such as a cone, endless belt, sheet, disc, etc. before use.

In either embodiment, it is often desired to completely fill the space between the contacting surface of the production tool and the front surface of the backing with the mixture of abrasive particles and binder precursor. Also in either embodiment, it is possible to apply the slurry to the substrate 112 and contact the slurry with the production tool rather than coating the slurry into the production tool and contacting the slurry with the substrate.

In a preferred method of this embodiment, the radiation energy is transmitted through the production tool 82 and directly into the mixture. It is preferred that the material from which the production tool 82 is made not absorb an appreciable amount of radiation energy or be degraded by radiation energy. For example, if electron beam energy is used, it is preferred that the production tool not be made from a cellulosic material, because the electrons will degrade the cellulose. If ultraviolet radiation or visible radiation is used, the production tool material should transmit sufficient ultraviolet or visible radiation, respectively, to bring about the desired level of cure. Alternatively, the substrate 112 to which the composite is bonded may allow transmission of the radiant energy therethrough. When the radiation is transmitted through the tool, substrates that absorb radiation energy can be used because the radiation energy is not required to be transmitted through the substrate.

The production tool 82 should be operated at a velocity that is sufficient to avoid degradation by the source of radiation. Production tools that have relatively high resistance to degradation by the source of radiation can be operated at relatively lower velocities; production tools that have relatively low resistance to degradation by the source of radiation can be operated at relatively higher velocities. In short, the appropriate velocity for the production tool depends on the material from which the production tool is made. The substrate to which the composite abrasive is bonded should be operated at the same speed as the production tool. The speed, along with other parameters such as temperature and tension, should be selected so as not to deleteriously affect the substrate or the production tool. Substrate speeds of from 15 to 76 meters/min. (50 to 250 feet/min.) have been found advantageous, however other speeds are also within the scope of the invention.

Figure 27:
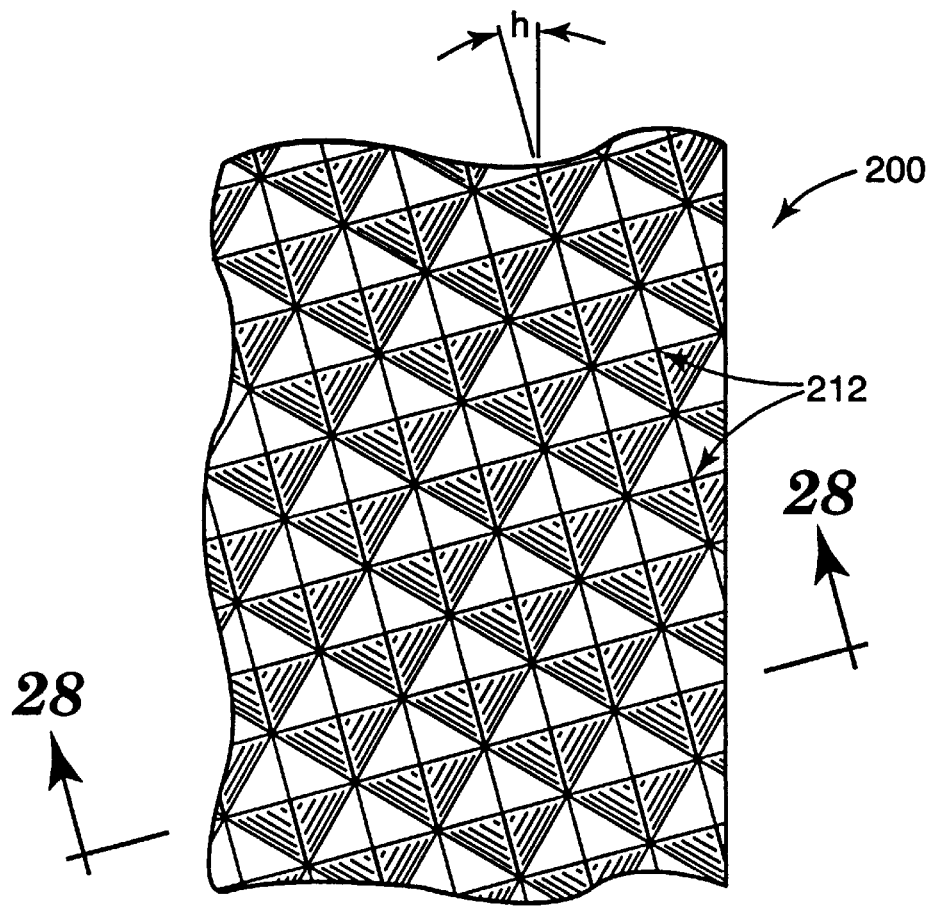
FIG. 27 is a plan view of an abrasive article made in accordance with the present invention.
Figure 28:
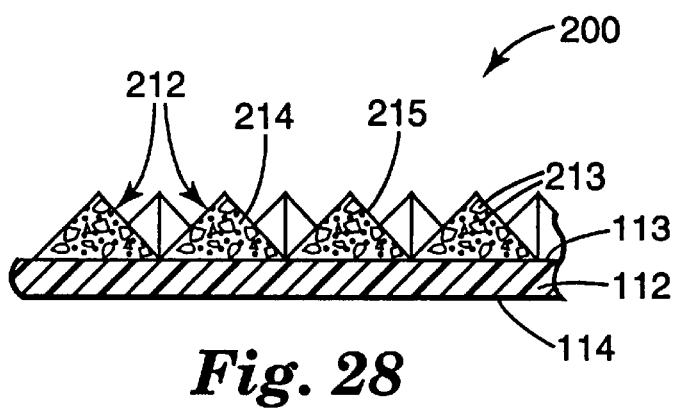
FIG. 28 is a cross-sectional view taken along line 28—28 of the abrasive article of FIG. 27.

A preferred embodiment of an abrasive article 200 provided in accordance with the above-described method is illustrated in FIGS. 27 and 28. Abrasive article 200 includes substrate 112 having first major surface 113 and second major surface 114. Structured abrasive composites 212 are bonded to first major surface 113 of substrate 112. Composites 212 comprise abrasive particles 213 dispersed in binder 214. Surfaces 215 define the precise shapes of the composites 212 as discussed above. As illustrated in FIG. 28, composites 212 can abut one another at their bases. The configuration of composites 212 will substantially conform to the configuration of the pyramids 60 on workpiece 30, and will be substantially the inverse of the pyramidal pockets 88 on production tool 82. When the knurl pattern on the master tool 30 has a helix angle (h), the abrasive article will have abrasive composites arranged in a pattern with an angle (h) relative to the longitudinal axis of the abrasive article. This provides the functional advantage of avoiding "scribing" the surface that is abraded by the abrasive article 200. Scribing can occur when the abrasive composites 212 are aligned so as to more heavily abrade a surface along the line of the peaks of the composites 212 in the composite pattern. For a sufficiently large angle (h), scribing can be avoided when abrading a surface with abrasive article 200.

Energy Sources

When the abrasive slurry comprises a thermosetting binder precursor, the binder precursor is cured or polymerized. This polymerization is generally initiated upon exposure to an energy source. Examples of energy sources include thermal energy and radiation energy. The amount of energy depends upon several factors such as the binder precursor chemistry, the dimensions of the abrasive slurry, the amount and type of abrasive particles and the amount and type of the optional additives. For thermal energy, the temperature can range from about 30 to 150° C., generally between 40 to 120° C. The time can range from about 5 minutes to over 24 hours. The radiation energy sources include electron beam, ultraviolet light, or visible light. Electron beam radiation, which is also known as ionizing radiation, can be used at an energy level of about 0.1 to about 10 Mrad, preferably at an energy level of about 1 to about 10 Mrad. Ultraviolet radiation refers to non-particulate radiation having a wavelength within the range of about 200 to about 400 nanometers, preferably within the range of about 250 to 400 nanometers. It is preferred that 300 to 600 Watt/inch ultraviolet lights are used. Visible radiation refers to non-particulate radiation having a wavelength within the range of about 400 to about 800 nanometers, preferably in the range of about 400 to about 550 nanometers. Other energy sources include infrared and microwave.

Substrate

Materials suitable for the substrate 112 of the abrasive article 200 described herein include polymeric film, paper, cloth, metallic film, vulcanized fiber, nonwoven substrates, combinations of the foregoing, and treated versions of the foregoing. It is preferred that the polymeric film backing be primed or otherwise treated as is known in the art to improve adhesion of the abrasive coating.

Abrasive Coating

The abrasive coating suitable for use with making abrasive articles according to the methods described herein comprises a plurality of precisely shaped abrasive composites 200, wherein the abrasive composites comprise a plurality of abrasive particles 213 dispersed in a binder 214. The binder can bond the abrasive composites to the first major surface of the substrate. The abrasive composite preferably has a discernible precise shape. It is preferred that the abrasive grains do not protrude beyond the planes of the shape before the coated abrasive article is used. As the coated abrasive article is used to abrade a surface, the composite breaks down revealing unused abrasive grains.

The expression "precisely shaped abrasive composite," as used herein, refers to abrasive composites having a shape that has been formed by curing a flowable mixture of abrasive grains and curable binder while the mixture is both being borne on a substrate and filling a cavity on the surface of a production tool. Such a precisely shaped abrasive composite would thus have precisely the same shape as that of the cavity. A plurality of such composites provide three-dimensional shapes that project outwardly from the surface of the substrate in a non-random pattern, namely the inverse of the pattern of the production tool. Each composite is defined by a boundary, the base portion of the boundary being the interface with the substrate to which the precisely shaped composite is adhered. The remaining portion of the boundary is defined by the cavity on the surface of the production tool in which the composite was cured. The entire outer surface of the composite is confined, either by the substrate or by the cavity, during its formation. The abrasive composites can be formed from a slurry comprising a plurality of abrasive grains dispersed in an uncured ungelled binder referred to as a binder precursor. Upon curing or gelling, the abrasive composites are set, i.e., fixed, in the predetermined shape and predetermined array.

The ratio, based on weight, of abrasive grain to binder generally ranges from about 1:1 to 4:1, preferably from about 2:1 to 3:1. This ratio varies depending upon the size of the abrasive grains and the type of binder employed.

Abrasive Particles

The abrasive particles 213 of the abrasive coating typically have a particle size ranging from about 0.1 to 1500 micrometers, preferably between about 0.1 to 400 micrometers and more preferably between 0.1 to 100 micrometers. A narrow distribution of particle size can often provide an abrasive article capable of producing a finer finish on the workpiece being abraded. Examples of such abrasive particles include fused aluminum oxide (which includes brown aluminum oxide, heat treated aluminum oxide, and white aluminum oxide), ceramic aluminum oxide, silicon carbide (including green, white, and black), chromia, alumina zirconia, diamond, iron oxide, ceria, cubic boron nitride, boron carbide, garnet, and combinations thereof. One example of a suitable heat treated aluminum oxide, grade P-240, is commercially available from H. C. Starck GmbH & Co., of Gusler, Germany.

The term "abrasive particles" also encompasses when single abrasive particles are bonded together to form an abrasive agglomerate. Abrasive agglomerates are known in the art and are exemplified by U.S. Pat. Nos. 4,311,489 (Kressner); 4,652,275 (Bloecher et al.) and 4,799,939 (Bloecher et al.).

It is also possible to have a surface coating on the abrasive particles. The surface coating may have many different functions. In some instances the surface coatings increase adhesion to the binder, alter the abrading characteristics of the abrasive particle and the like. Examples of surface coatings include coupling agents, halide salts, metal oxides including silica, refractory metal nitrides, refractory metal carbides and the like.

In the abrasive composite there may also be diluent particles. The particle size of these diluent particles may be on the same order of magnitude as the abrasive particles. Examples of such diluent particles include gypsum, marble, limestone, flint, silica, glass bubbles, glass beads, aluminum silicate, and the like.

Binder

The abrasive particles are dispersed in an organic binder 214 to form the abrasive composite coating. The binder must be capable of providing a medium in which the abrasive grains can be distributed. The binder is preferably capable of being cured or gelled relatively quickly so that the abrasive article can be quickly fabricated. Some binders gel relatively quickly, but require a longer time to fully cure. Gelling preserves the shape of the composite until curing commences. Fast curing or fast gelling binders result in coated abrasive articles having abrasive composites of high consistency. The organic binder can be a thermoplastic binder, however, it is preferably a thermosetting binder. The binder is formed from a binder precursor. During the manufacture of the abrasive coating, the thermosetting binder precursor is exposed to an energy source which aids in the initiation of the polymerization or curing process. Examples of energy sources include thermal energy and radiation energy which includes electron beam, ultraviolet light, and visible light. After this polymerization process, the binder precursor is converted into a solidified binder. Alternatively for a thermoplastic binder precursor, during the manufacture of the abrasive article the thermoplastic binder precursor is cooled to a degree that results in solidification of the binder precursor. Upon solidification of the binder precursor, the abrasive composite is formed.

The binder in the abrasive composite is generally also responsible for adhering the abrasive composite to the first major surface of the substrate. However, in some instances there may be an additional adhesive layer between the surface of the substrate and the abrasive composite. This additional adhesive can be selected from the various binders described herein, or may be any other suitable binder.

There are two main classes of thermosetting resins, condensation curable and addition polymerized resins. The preferred binder precursors are addition polymerized resin because they are readily cured by exposure to radiation energy. Addition polymerized resins can polymerize through a cationic mechanism or a free radical mechanism. Depending upon the energy source that is utilized and the binder precursor chemistry, a curing agent, initiator, or catalyst is sometimes preferred to help initiate the polymerization.

Examples of typical binders precursors include phenolic resins, urea-formaldehyde resins, melamime formaldehyde resins, acrylated urethanes, acrylated epoxies, ethylenically unsaturated compounds, aminoplast derivatives having pendant unsaturated carbonyl groups, isocyanurate derivatives having at least one pendant acrylate group, isocyanate derivatives having at least one pendant acrylate group, vinyl ethers, epoxy resins, and mixtures and combinations thereof. The term acrylate encompasses acrylates and methacrylates.

Phenolic resins are widely used in abrasive article binders because of their thermal properties, availability, cost and ease of handling. There are two types of phenolic resins, resole and novolac. Resole phenolic resins have a molar ratio of formaldehyde to phenol of at least 1:1, typically from 1.5:1 to 3:1. Novolac resins have a molar ratio of formaldehyde to phenol of less than 1:1. Examples of commercially available phenolic resins include those known by the tradenames "Durez" and "Varcum" from Occidental Chemicals Corp.; "Resinox" from Monsanto; "Aerofene" from Ashland Chemical Co. and "Arotap" from Ashland Chemical Co.

Acrylated urethanes are diacrylate esters of hydroxy terminated NCO extended polyesters or polyethers. Examples of commercially available acrylated urethanes include "UVITHANE 782", available from Morton Thiokol Chemical, and "CMD 6600", "CMD 8400", and "CMD 8805", available from Radcure Specialties.

Acrylated epoxies are diacrylate esters of epoxy resins, such as the diacrylate esters of bisphenol A epoxy resin. Examples of commercially available acrylaied epoxies include "CMD 3500", "CMD 3600", and "CMD 3700", available from Radcure Specialities.

Ethylenically unsaturated resins include monomeric or polymeric compounds that contain atoms of carbon, hydrogen, and oxygen, and optionally, nitrogen and the halogens. Oxygen or nitrogen atoms or both are generally present in ether, ester, urethane, amide, and urea groups. Ethylenically unsaturated compounds preferably have a molecular weight of less than about 4,000 and are preferably esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like. Representative examples of acrylate resins include methyl methacrylate, ethyl methacrylate styrene, divinylbenzene, vinyl toluene, ethylene glycol diacrylate, ethylene glycol methacrylate, hexanediol diacrylate, triethylene glycol diacrylate, trimethylol propane triacrylate, glycerol triacrylate, pentaerythritol triacrylate, pentaerythritol methacrylate, pentaerythritol tetraacrylate and pentaerythritol tetraacrylate. Other ethylenically unsaturated resins include monoallyl, polyallyl, and polymethallyl esters and amides of carboxylic acids, such as diallyl phthalate, diallyl adipate, and N,N-diallyladipamide. Still other nitrogen containing compounds include tris(2-acryloyloxyethyl)isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

The aminoplast resins have at least one pendant alpha, beta-unsaturated carbonyl group per molecule or oligomer. Examples of such materials include N-(hydroxymethyl)-acrylamide, N,N'-oxydimethylenebisacrylamide, ortho and para acrylamidomethylated phenol, acrylamidomethylated phenolic novolac, and combinations thereof These resins are known in the art and are exemplified by U.S. Pat. Nos. 4,903,440 (Larson et al.) and 5,236,472 (Kirk).

Isocyanurate derivatives having at least one pendant acrylate group and isocyanate derivatives having at least one pendant acrylate group are exemplified by U.S. Pat. No. 4,652,274 (Beottcher et al.). The preferred isocyanurate material is a triacrylate of tris(hydroxy ethyl) isocyanurate.

Epoxy resins have an oxirane and are polymerized by the ring opening. Such epoxide resins include monomeric epoxy resins and oligomeric epoxy resins. Examples of some preferred epoxy resins include 2,2-bis[4-(2,3-epoxypropoxy)-phenyl propane] (diglycidyl ether of bisphenol) and commercially available materials under the trade designation "Epon 828", "Epon 1004", and "Epon 1001F" available from Shell Chemical Co., "DER-331", "DER-332", and "DER-334" available from Dow Chemical Co. Other suitable epoxy resins include glycidyl ethers of phenol formaldehyde novolac (e.g., "DEN-431" and "DEN-428" available from Dow Chemical Co.).

The epoxy resins of the invention can polymerize via a cationic mechanism with the addition of an appropriate cationic curing agent. Cationic curing agents generate an acid source to initiate the polymerization of an epoxy resin. These cationic curing agents can include a salt having an onium cation and a halogen containing a complex anion of a metal or metalloid. Other cationic curing agents include a salt having an organometallic complex cation and a halogen containing complex anion of a metal or metalloid. Such curing agents are known in the art and are exemplified by U.S. Pat. No. 4,751,138 (Tumey et al.) (especially column 6, line 65 to column 9, line 45). Another example known in the art is an organometallic salt and an onium salt as exemplified by U.S. Pat. No. 4,985,340 (Palazzotto) (especially column 4, line 65 to column 14, line 50) and European Patent Applications 306,161 (Brown-Wensley et al.) and 306,162 (Palazzotto et al.). Still other cationic curing agents known in the art include an ionic salt of an organometallic complex in which the metal is selected from the elements of Periodic Group IVB, VB, VIB, VIIB and VIIIB which is described in European Patent Application 109,851 (Palazzotto et al.).

Regarding free radical curable resins, in some instances it is preferred that the abrasive slurry further comprise a free radical curing agent. However in the case of an electron beam energy source, the curing agent is not always required because the electron beam itself generates free radicals.

Examples of free radical thermal initiators include peroxides, e.g., benzoyl peroxide, azo compounds, benzophenones, and quinones. For either ultraviolet or visible light energy source, this curing agent is sometimes referred to as a photoinitiator. Examples of initiators, that when exposed to ultraviolet light generate a free radical source, include but are not limited to those selected from the group consisting of organic peroxides, azo compounds, quinones, benzophenones, nitroso compounds, acryl halides, hydrozones, mercapto compounds, pyrylium compounds, triacryliridazoles, bisimidazoles, chloroalkytriazines, benzoin ethers, benzil ketals, thioxanthones, and acetophenone derivatives, and mixtures thereof A preferred photoinitiator for use with ultraviolet radiation is 2,2-dimethoxy-1,2-dephenyl-1-ethanone. Examples of initiators known in the art that generate a free radical source when exposed to visible radiation can be found in U.S. Pat. No. 4,735,632, (Oxman et al.). A preferred initiator for use with visible light is "Irgacure 369" commercially available from Ciba Geigy Corporation.

Additives

The abrasive slurry to make the abrasive coating can further comprise optional additives, such as, for example, fillers (including grinding aids), fibers, lubricants, wetting agents, thixoprotic materials, surfactants, pigments, dyes, antistatic agents, coupling agents, release agents, plasticizers, suspending agents, and mixtures thereof The amounts of these materials are selected to provide the properties desired. The use of these can affect the erodability of the abrasive composite. In some instances an additive is purposely added to make the abrasive composite more erodable, thereby expelling dulled abrasive particles and exposing new abrasive particles.

The term filler also encompasses materials that are known in the abrasive industry as grinding aids. A grinding aid is defined as particulate material that the addition of which has a significant effect on the chemical and physical processes of abrading which results in improved performance. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, magnesium chloride. Examples of metals include, tin, lead, bismuth, cobalt, antimony, cadmium, iron titanium. Other miscellaneous grinding aids include sulfur, organic sulfur compounds, graphite and metallic sulfides.

Examples of antistatic agents include graphite, carbon black, vanadium oxide, humectants, and the like. These antistatic agents are known in the art and are exemplified by U.S. Pat. Nos. 5,061,294 (Harmer et al.); 5,137,542 (Buchanan et al.), and 5,203,884 (Buchanan et al.).

A coupling agent can provide an association bridge between the binder precursor and the filler particles or abrasive particles. The addition of the coupling agent significantly reduces the coating viscosity of the slurry used to form abrasive composites. Examples of coupling agents include silanes, titanates, and zircoaluminates. One example of a suitable silane coupling agent, 3-methacryloxypropyl-trimethoxysilane, is commercially available from Union Carbide under the trade designation "A-174". The abrasive slurry preferably contains anywhere from about 0.01 to 3% by weight coupling agent.

An example of a suspending agent is an amorphous silica particle having a surface area less than 150 meters square/ gram that is commercially available from DeGussa Corp., under the trade name "OX-50".

It is also within the scope of the present invention to make abrasive composite particles. In general, the method involves the steps of a) coating an abrasive slurry into the cavities of a production tool; b) exposing the abrasive slurry to conditions to solidify the binder precursor, form a binder, and form abrasive composites; c) removing the abrasive composites form the production tool; and d) converting the abrasive composites into composite particles. These abrasive composite particles can be used in bonded abrasives, coated abrasives, and nonwoven abrasives. This method is described in greater detail in PCT WO 95/01241, the entire disclosure of which is incorporated herein by reference.

The operation of the present invention will be further described with regard to the following detailed examples. These examples are offered to further illustrate the various specific and preferred embodiments and techniques. It should be understood, however, that many variations and modifications may be made while remaining within the scope of the present invention.

EXAMPLE 1

Knurling Process

An eight inch diameter, 28 inch long, 1026 mild steel workpiece was first plated with a thin layer of bright nickel to prevent corrosion and improve adhesion to plated copper. Next, 0.050 in. of hard copper, 240 knoop, was plated over the bright nickel. One end of the plated workpiece was mounted in a four jaw chuck and the other end supported with a center in the tail stock of a Clausing engine lathe equipped with a low pressure pump and water-based coolant. The workpiece outer surface was faced off smooth, leaving 0.030 in. of hard copper.

A Zeus Cut-Knurling Tool Model NO. 209 was provided with a high speed steel ("HSS") first knurling wheel 12'. First knurling wheel had a 30° left tooth incline, 36 teeth per inch ("TPI"), with the teeth having a 90° included angle at the tooth ridge. The tool was also provided with a HSS second knurling wheel 14. The second knurling wheel had a 0° tooth incline angle, 36 TPI, with a 90° included angle at the tooth ridge. Both wheel orientations were adjusted by setting the wheel mounting posts to the 200 mm (7.9 inch) workpiece O.D. position. The wheel axis were each approximately 30° relative to the tool center plane 24. The Cut-Knurling Tool was then mounted on the cross slide of the lathe. The height of the tool was adjusted so that both wheels would contact the workpiece at the same time. The top wheel 12' was then removed. Coolant flow was directed at the second wheel 14 to wash away chips as they formed.

1) Second wheel 14 was engaged with the workpiece. The lathe rotated the workpiece in direction A' at 80 rpm with a tool feed rate in direction B of 0.010 inch/revolution from right to left. The depth of cut of the first wheel 14 was adjusted to give about 75% of a full knurl.

2) The second wheel 14 was then removed and the first wheel 12' was reinstalled. The lathe rotated the workpiece in direction A at the same conditions as above with tool direction B from right to left.

3) The first wheel 12' was removed, and second wheel 14 was reinstalled. This third step repeated the first step, except the tool was adjusted to provide full knurl depth.

4) The second wheel 14 was removed, and first wheel 12' was reinstalled. This fourth step repeated the second step, except the tool was adjusted to provide full knurl depth.

5) The first wheel 12' was removed and the second wheel 14 was reinstalled. This fifth step repeated the third step again at full knurl depth.

The resulting knurled workpiece surface was covered with a knurl pattern of 36.7 square-based pyramids per inch measured in the direction parallel to an edge of the base of the pyramid, having an average height of 0.0099 inches. The tops of the pyramids were rounded corresponding to the rounded valley of the knurl wheels. The peaks of the pyramidal pattern had a 11.5° helix angle with respect to a plane perpendicular to the longitudinal axis of the workpiece. The workpiece was coated with a protective layer of electroless nickel to prevent corrosion and improve polymer release characteristics before use.

Production Tool

The workpiece was used to make production tooling by the process shown in FIG. 23. First the workpiece was installed at 30. The workpiece, or master tool was held at 60° C. (140° F.) and roll 102 at 21° C. (70° F.). Escorene Polypropylene 3445 at 214° C. (417° F.) was extruded on to the master tool. A 0.022 inch thick seamless film was collected at 3.6 meters/minute (11.8 fpm). The surface of the film had an uninterrupted pattern of pyramidal pockets on its surface which were the inverse of those on the knurled workpiece.

Abrasive Article

An abrasive article was prepared using the process illustrated in FIG. 25. The production tool was installed as component 82 with the pockets on side 86. The substrate 112 was an X weight poly cotton. It had a latex/phenolic resin treatment (85 parts/15 parts based upon cured resin) on the front side 113.

A radiation curable precursor was prepared by mixing components in the following table with a high shear mixer until all agglomerated solids have dispersed.

| Component | Wt percent |
| --- | --- |
| Trimethylol propane triacrylate | 39.54 |
| Triacrylate of tris(hydroxyethyl) isocyanurate | 16.95 |
| Potassium tetrafluoroborate, 98% pure micropulverized | 38.97 |
| Amorphous silica, Degussa OX-50 | 1.99 |

-continued

| Component | Wt percent |
| --- | --- |
| Silane coupling agent, Union Carbide A-174 | 1.99 |
| Irgacure 369, Ciba Geigy Corp. | 0.56 |

Next, a radiation curable abrasive slurry was prepared by mixing 41.5 wt percent of the above precursor with 58.5 wt percent of grade 180 BT-R available from U.S. Electrofused Minerals, Inc., Baltimore Md., for 20 minutes at 1200 rpm in a high shear mixer.

The abrasive slurry was coated into the pockets of the production tool using a knife coater, 118, with a 51 micrometer (2 mils) gap. The radiation source was two visible lamps each operating at 600 watts/inch. The process was run at 15 meters/minute (50 feet/minute). The abrasive article was removed from the apparatus of FIG. 25 and heated for 12 hours at 115° C. (240° F.) to fully cure the latex/phenolic backing treatment.

The structured abrasive was converted to a 7.6 cm (3 inch) by 335 cm (132 inch) endless belt and tested on a 304 stainless steel test piece on a backstand grinder. No scribing or groove pattern was observed in the surface of the abraded surface of the test piece.

EXAMPLE 2

Knurling Process

An eight inch diameter, 28 inch long steel workpiece was plated to provide a 0.060 inch layer of soft copper on its surface. The workpiece was mounted in a four jaw chuck and the other end supported with a center in the tail stock of a Lodge and Shipley engine lathe equipped with a low pressure pump and water-based coolant. The workpiece outer surface was faced-off smooth. leaving 0.015 inch of the soft copper A Dorian CNC-107-100-3M knurling tool was fitted with two cobalt chrome cut knurling wheels, 50 TPI, tooth ridge included angle of 90°. The tooth incline angle of each wheel was 0°. The mounting posts of the knurling tool oriented the first wheel 12 at angle (a) 43° and the second wheel 14 at −47° with respect to the center plane 24 of the workpiece, thus having tooth included angle offset (g) of 2°. The knurling tool was mounted on the cross side of the lathe. The tool shank was checked to make sure it was perpendicular to the workpiece. The second wheel 14 was removed. Coolant flow was directed at the wheel to wash away chips as they formed.

1) The lathe was run in direction A at 66 rpm, with the tool feed rate of 0.010 inch/rev in direction B from left to right. The depth of cut of first wheel 12 was adjusted to get fill depth. The wheel produced 1.5 inch long chips.

2) The first wheel 12 was removed and reinstalled in the position of second wheel 14. The lathe was run in direction A' at 66 rpm, with the tool feed rate of 0.010 inch/rev in direction B from left to right. The depth of cut was adjusted to get full depth. Examination of the workpiece showed burring and deformation in the first plurality of grooves.

3) The wheel was removed from the second position and reinstalled in the first position. A third cleaning pass was made down the first plurality of grooves at the same depth as the initial cut. The wheel tracked well. Inspection showed that the burring and deformation was removed from the first plurality of grooves leaving sharp-edged, well defined pyramids. Only slight periodic burring was evident in the second plurality of grooves.

The resulting workpiece had an array of 50 square-based pyramids/inch measured in the direction parallel to en edge of the base of the pyramid, having an average height of 0.0094 inches. The peaks had a 1.1° helix angle with respect to a plane perpendicular to the longitudinal axis of the workpiece. The workpiece was coated with a protective layer of electroless nickel to prevent corrosion and improve polymer release characteristics before use.

Production Tool

The workpiece was used to make a production tool by the process shown in FIG. 23. First the workpiece was installed at 30. The workpiece, or master tool was held at 60° C. (140° F.) and roll 102 at 21° C. (70° F.). Escorene Polypropylene 3445 at 214° C. (417° F.) was extruded on to the master tool. A 0.022 inch thick seamless film was collected at 3.6 meters/minute (11.8 fpm). The surface of the film had pyramidal pockets on its surface which were the inverse of those on the knurled workpiece.

Abrasive Article

An abrasive article was prepared using the process shown in FIG. 26. An endless belt of the production tooling was prepared by ultrasonically welding. This belt was installed as component 82 with the pockets on side 86. The substrate 142 was a J weight rayon. It had a latex/phenolic resin treatment (85 parts/15 parts based upon cured resin) on side 143. An abrasive article was produced as described in Example 1, except that the abrasive slurry was made using P-320 F7TX mineral from H. C. Stark, Inc., Newton, Mass.

The abrasive slurry was coated into the pockets of the production tool using a knife coater, 146, with a 76 micrometer (3 mils) gap. The radiation source was one visible lamp operating at 600 watts/inch. The process was run at 15 meters/minute (50 feet/minute). The abrasive article was removed from the apparatus of FIG. 26 and heated for 12 hours at 115° C. (240° F.) to fully cure the latex/phenolic backing treatment.

The coated abrasive was converted to a 7.6 cm (3 inch) by 335 cm (132 inch) endless belt and tested on a 304 stainless steel test piece on a backstand grinder A ripple or scribe pattern with 0.020 inch spacing was imparted on the surface of the test piece. The helix angle of this sample was not sufficient to prevent scribing of the test piece by the tips of the pyramids on the structured abrasive.

EXAMPLE 3

Knurling Process

An eight inch diameter, 28 inch long, 1026 mild steel roll was mounted in a four jaw chuck and the other end supported with a center in the tail stock of a Lodge and Shipley engine lathe equipped with a low pressure pump and water-based coolant. A Zeus Cut-Knurling Tool Model NO. 209 was provided with a HSS first knurling wheel 12'. The first wheel 12' had a tooth incline angle of 30° left, 25 TPI, and a 90° included angle at the tooth ridge. The HSS second knurling wheel 14 had a tooth incline angle of 0°, 25 TPI, and a 90° tooth ridge included angle. The wheel mounting posts were adjusted to 200 mm (7.9 inch) workpiece O.D. After mounting the Cut-Knurling tool and adjusting it for height, the first cutting wheel 12' was removed. Coolant flow was directed at the wheel to wash away chips as they formed.

1) The lathe was run in direction A' at 77 rpm, with a tool feed rate of 0.010 inch/revolution from right to left. The depth of cut of the second wheel 14 was adjusted to give about 75% of a full knurl.

2) The second wheel 14 was then removed and the first wheel 12' was reinstalled. The lathe was run in direction A at the same conditions as step one, with the same tool advance as step one.

3) The first wheel 12' was removed and second wheel 14 was reinstalled. This third step repeated the first step, except the knurling wheel was adjusted to full knurl depth.

4) The second wheel 14 was removed and the first wheel 12' was reinstalled. This fourth step repeated the second step except the knurling wheel was adjusted to full knurl depth.

5) The first wheel 12' was removed and the second wheel 14 was reinstalled. This fifth step repeated the third step at full knurl depth.

The resulting knurled workpiece surface had sharp, well-formed square-based pyramids with an average height of 0.0141 inches. The pyramid peaks had an 11.5° helix angle with respect to a plane perpendicular to the longitudinal axis of the workpiece. The workpiece was coated with a protective layer of electroless nickel to prevent corrosion and improve polymer release characteristics before use.

Production Tool and Abrasive Article

The knurled workpiece was used to produce 0.024 inch thick production tool by the process described in Example 1. This production tool was used to make a coated abrasive using the process illustrated in FIG. 25. The substrate 112 was an X weight poly cotton with the same latex/phenolic resin treatment as Example 1. The abrasive slurry was formulated from 40.20% radiation curable precursor and 59.80% grade 150 BT-R available from U.S. Electrofused Minerals, Inc., Baltimore Md.

The slurry was coated into the pockets of the production tool using a knife coater 118 with a 51 micrometer (2 mil) gap. The radiation source was two visible lamps operating at 600 watts/inch each. The process was run at 30 meters/minute (100 feet/minute). The abrasive article was removed from the apparatus of FIG. 25 and heated for 12 hours at 115° C. (240° F.) to fully cure the latex/phenolic backing treatment.

The coated abrasive was converted to a 7.6 cm (3 inch) by 335 cm (132 inch) endless belt. The abrasive article was tested on a 304 stainless steel test piece on a backstand grinder. No groove or scribe pattern was observed in the abraded surface of the test piece.

The present invention has now been described with reference to several embodiments thereof The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A method of knurling a workpiece, the workpiece having a longitudinal axis, the method comprising the steps of:
   a) imparting a first plurality of grooves to the workpiece, wherein the first plurality of grooves have a first groove helix angle with respect to a reference plane normal to the longitudinal axis of the workpiece;
   b) imparting a second plurality of grooves to the workpiece, wherein the second plurality of grooves have a second groove helix angle with respect to the reference plane, the second plurality of grooves intersecting the first plurality of grooves, thereby imparting a knurl pattern to the outer surface of the workpiece, wherein the pattern is continuous and uninterrupted around the circumference of the workpiece, and wherein the first and second groove helix angles are of substantially unequal magnitude.

2. The method of claim 1, wherein the sum of the magnitudes of the first and second helix angles is approximately 90 degrees.

3. The method of claim 2, wherein the magnitude of the first helix angle is approximately 60 degrees and the magnitude of the second helix angle is approximately 30 degrees.

4. The method of claim 1, wherein the difference in magnitudes of the first and second groove helix angles is at least 5 degrees.

5. The method of claim 1, wherein the first and second grooves each comprise a first groove surface, a second groove surface, and a groove base, wherein the first and second groove surfaces each extend from an outer surface of the workpiece to each respective groove base.

6. The method of claim 5, wherein each respective groove base is a line formed at each respective juncture of the first and second groove surfaces.

7. The method of claim 6, wherein the intersection of the first and second grooves thereby forms a plurality of pyramids on the outer surface of the workpiece, each of said pyramids including first opposed side surfaces formed by the first grooves and second opposed side surfaces formed by the second grooves.

8. The method of claim 1, wherein step a) comprises form knurling the first plurality of grooves and step b) comprises form knurling the second plurality of grooves.

9. The method of claim 1, wherein step a) comprises cut knurling the first plurality of grooves and step b) comprises cut knurling the second plurality of grooves.

10. The method of claim 1, wherein one of step a) and b) comprises cut knurling, and wherein the other of step a) and b) comprises form knurling.

11. A knurled workpiece made according to the method of claim 1.

12. A method of molding a molded article with a knurled workpiece made according to claim 1, comprising the steps of:
   a) applying a moldable material to the outer surface of the workpiece;
   b) while the moldable material is in contact with the workpiece, applying sufficient force to the moldable material to impart the inverse of the pattern on the outer surface of the workpiece to a first surface of the moldable material in contact with the workpiece; and
   c) removing the moldable material from the workpiece.

13. The method of molding an article of claim 12, comprising the further step of:
   d) rotating the workpiece at least 1 revolution concurrently with steps a) through c) to thereby mold an article having a length greater than the circumference of the workpiece, wherein the pattern imparted to the molded article is continuous and uninterrupted along its length.

14. A molded article made in accordance with the method of claim 12.

15. A knurled workpiece having a knurled, cylindrical outer surface, the knurled workpiece comprising:
   a cylindrical body having a longitudinal axis and an outer cylindrical surface, said outer surface having a knurl pattern thereon;
   wherein said knurl pattern comprises
      a first plurality of grooves, said first plurality of grooves having a first groove helix angle with respect to a reference plane normal to said longitudinal axis of said workpiece;
      a second plurality of grooves, said second plurality of grooves having a second groove helix angle with respect to said reference plane, said second plurality of grooves intersecting said first plurality of grooves; and
   wherein said knurl pattern is continuous and uninterrupted around the circumference of said workpiece, and wherein said first and second groove helix angles are of substantially unequal magnitude.

16. The knurled workpiece of claim 15, wherein the sum of the magnitudes of said first and second helix angles is approximately 90 degrees.

17. The knurled workpiece of claim 16, wherein the magnitude of said first helix angle is approximately 60 degrees and the magnitude of said second helix angle is approximately 30 degrees.

18. The knurled workpiece of claim 15, wherein the difference in magnitudes of said first and second groove helix angles is at least 5 degrees.

19. The knurled workpiece of claim 15, wherein said first and second pluralities of grooves each comprise a first groove surface, a second groove surface, and a groove base, wherein said first and second groove surfaces each extend from said outer surface of said workpiece to each respective groove base.

20. The knurled workpiece of claim 19, wherein each respective groove base comprises a line formed at each respective juncture of said first and second groove surfaces.

21. The knurled workpiece of claim 20, wherein the intersection of the first and second grooves thereby forms a plurality of pyramids on said outer surface of said workpiece, each of said pyramids including first opposed side surfaces formed by said first grooves and second opposed side surfaces formed by said second grooves.

22. A method of molding a molded article with the knurled workpiece of claim 15, comprising the steps of:
   a) applying a moldable material to the outer surface of the knurled workpiece;
   b) while the moldable material is in contact with the knurled workpiece, applying sufficient force to the moldable material to impart the inverse of the pattern on the outer surface of the knurled workpiece to a first surface of the moldable material in contact with the master tool; and
   c) removing the moldable material from the knurled workpiece.

23. The method of molding an article of claim 22, comprising the further step of:
   d) rotating the knurled workpiece at least 1 revolution concurrently with steps a) through c) to thereby mold an article having a length greater than the circumference of the knurled workpiece, wherein the pattern imparted to the molded article is continuous and uninterrupted along its length.

24. A molded article made in accordance with the method of claim 22.

25. A method of cut knurling a workpiece, the workpiece having a longitudinal axis, the method comprising the steps of:
   a) rotating the workpiece in a first rotational direction about its longitudinal axis,
   b) engaging the workpiece with a first knurling wheel, wherein the first knurling wheel includes a plurality of teeth on a working surface of the knurling wheel, the teeth each including a cutting edge on a first end thereof, and wherein the first knurling wheel is configured so as to engage the workpiece with the cutting edge of the teeth;
   c) traversing the first knurling wheel in a direction parallel to the longitudinal axis of the workpiece, thereby forming a first plurality of grooves in the workpiece;

d) disengaging the first knurling wheel form the workpiece;

e) rotating the workpiece in a second rotational direction opposite to the first rotational direction;

f) engaging the workpiece with a second knurling wheel, wherein the second knurling wheel includes a plurality of teeth on a working surface of the knurling wheel, the teeth each including a cutting edge on a first end thereof, and wherein the second knurling wheel is configured so as to engage the workpiece with the cutting edge of the teeth; and g) traversing the second knurling wheel in a direction parallel to the longitudinal axis of the workpiece, thereby forming a second plurality of grooves in the workpiece, the second plurality of grooves intersecting the first plurality of grooves, thereby imparting a pattern to the outer surface of the workpiece, wherein the pattern is continuous and uninterrupted around the circumference of the workpiece.

26. The method of claim 25, wherein the first and second cutting wheels are arranged such that the second plurality of grooves intersects the first plurality of grooves at approximately 90 degrees.

27. The method of claim 26, wherein the first and second pluralities of grooves each comprise a first groove surface, a second groove surface, and a groove base, wherein the first and second groove surfaces each extend form an outer surface of the workpiece to each respective groove base.

28. The method of claim 27, wherein each respective groove base is a line formed at each respective juncture of the first and second groove surfaces.

29. The method of claim 28, wherein the intersection of the first and second grooves thereby forms a plurality of pyramids on the outer surface of the workpiece, each of said pyramids including first opposed side surfaces formed by the first grooves and second opposed side surfaces formed by the second grooves.

30. The method of claim 25, wherein the first plurality of grooves have a first helix angle defined with respect to a reference plane normal to the longitudinal axis of the workpiece, the second plurality of grooves have a second helix angle defined with respect to the reference plane.

31. The method of claim 30, wherein the first and second groove helix angles are of substantially unequal magnitude.

32. The method of claim 31, wherein the first and second groove helix angles are of substantially equal magnitude and of opposite sense with respect to the reference plane.

33. The method of molding an article of claim 32, comprising the further step of:

d) rotating the workpiece at least 1 revolution concurrently with steps a) through c) to thereby mold an article having a length greater than the circumference of the workpiece, wherein the pattern imparted to the workpiece is continuous and uninterrupted along its length.

34. A workpiece made according to the method of claim 25.

35. A method of molding a molded article with a knurled workpiece made according to claim 25, comprising the steps of:

a) applying a moldable material to the outer surface of the workpiece;

b) while the moldable material is in contact with the workpiece, applying sufficient force to the moldable material to impart the inverse of the pattern on the outer surface of the workpiece to a first surface of the moldable material in contact with the workpiece; and c) removing the moldable material form the workpiece.

* * * * *

UNITED STATES PATENT AND TRADEMARK OFFICE
CERTIFICATE OF CORRECTION

PATENT NO. : 5,975,987
DATED : November 2, 1999
INVENTOR(S) : Timothy L. Hoopman, Stanley B. Collins and James A. Servatius It is certified that error appears in the above-identified patent and that said Letters Patent is hereby corrected as shown below:

Column 9,
Line 27, "KNURLRNG" should read -- KNURLING --.

Column 17,
Line 43, "filly" should read -- fully --.

Column 22,
Line 9, "acrylaied" should read -- acrylated --.
Line 45, after "thereof" add -- . --.

Column 23,
Lines 36 and 50, after "thereof" add -- . --.

Column 25,
Line 29, "pyrarnids" should read -- pyramids --.

Column 28,
Line 36, after "thereof" add -- . --.

Signed and Sealed this

Sixteenth Day of April, 2002

JAMES E. ROGAN
Director of the United States Patent and Trademark Office

*Attest:*

*Attesting Officer*